United States Patent
Brown et al.

(10) Patent No.: US 6,579,204 B2
(45) Date of Patent: Jun. 17, 2003

(54) SYNCHRONIZED TWO-SPEED TRANSFER CASE WITH LOCKABLE LIMITED SLIP DIFFERENTIAL

(75) Inventors: David Brown, deceased, late of Norfolk (GB), Janet Brown, Legal Representative; Richard Eastman, Central Drive, NY (US); Sankar K. Mohan, Syracuse, NY (US); Nancy Mintonye, Kirkville, NY (US)

(73) Assignee: New Venture Gear, Inc., Troy, MI (US)

( * ) Notice: Subject to any disclaimer, the term of this patent is extended or adjusted under 35 U.S.C. 154(b) by 0 days.

(21) Appl. No.: 09/970,439

(22) Filed: Oct. 3, 2001

(65) Prior Publication Data

US 2002/0042318 A1 Apr. 11, 2002

Related U.S. Application Data

(60) Continuation-in-part of application No. 09/883,701, filed on Jun. 18, 2001, now Pat. No. 6,398,688, which is a division of application No. 09/512,960, filed on Feb. 25, 2000, now Pat. No. 6,283,887.
(60) Provisional application No. 60/123,451, filed on Mar. 9, 1999.

(51) Int. Cl.$^7$ ............................................. B60K 17/346
(52) U.S. Cl. ....................................... 475/204; 180/249
(58) Field of Search ............................... 475/199, 204, 475/206, 248, 252, 299; 180/247, 248, 249

(56) References Cited

U.S. PATENT DOCUMENTS

| | | |
|---|---|---|
| 4,770,280 A | 9/1988 | Frost |
| 5,006,098 A | 4/1991 | Yoshinaka et al. |
| 5,057,062 A | 10/1991 | Yamasaki et al. |
| 5,092,188 A | 3/1992 | Fujikawa et al. |
| 5,286,238 A | 2/1994 | Shimizu et al. |
| 5,323,871 A | 6/1994 | Wilson et al. |
| 5,443,429 A | 8/1995 | Baxter, Jr. |
| 5,518,464 A * | 5/1996 | Teraoka ...................... 475/252 |
| 5,655,986 A | 8/1997 | Wilson et al. |
| 5,697,861 A | 12/1997 | Wilson |
| 5,700,222 A | 12/1997 | Bowen |
| 5,702,321 A | 12/1997 | Bakowski et al. |
| 5,836,847 A | 11/1998 | Pritchard |
| 5,902,205 A | 5/1999 | Williams |
| 5,911,644 A | 6/1999 | Williams |
| 5,951,429 A | 9/1999 | Eastman |
| 5,984,821 A * | 11/1999 | Showalter .................... 475/204 |
| 6,022,289 A | 2/2000 | Francis |
| 6,113,512 A * | 9/2000 | Williams ..................... 475/204 |
| 6,152,848 A * | 11/2000 | Williams et al. ............ 475/204 |
| 6,283,887 B1 * | 9/2001 | Brown et al. ................ 475/204 |
| 6,398,688 B2 * | 6/2002 | Brown et al. ................ 475/204 |

* cited by examiner

Primary Examiner—Ankur Parekh
(74) Attorney, Agent, or Firm—Harness, Dickey & Pierce P.L.C.

(57) ABSTRACT

A full-time power transfer system is disclosed to include a transfer case having a clutch assembly arranged to control speed differentiation and torque biasing across an interaxle differential, sensors for detecting and generating sensor signals indicative of various dynamic and operational characteristics of the vehicle, and a controller for controlling actuation of the clutch assembly in response to the sensor signals. Upon the occurrence of traction loss, the clutch assembly is automatically actuated for limiting interaxle slip while transferring increased drive torque to the non-slipping driveline. Under a preferred adaptive control scheme, the actuated condition of the clutch assembly is controllably modulated between its non-actuated and fully-actuated limits for automatically varying the magnitude of speed differentiation and torque biasing across the interaxle differential in response to changes in the dynamic and operational characteristics of the vehicle.

34 Claims, 13 Drawing Sheets

SYNCHRONIZED TWO-SPEED TRANSFER CASE WITH LOCKABLE LIMITED SLIP DIFFERENTIAL

CROSS REFERENCE

This application is a continuation-in-part of U.S. patent application Ser. No. 09/883,701 filed Jun. 18, 2001, now U.S. Pat. No. 6,398,688, which is a divisional application of Ser. No. 09/512,960. filed Feb. 25, 2000 now U.S. Pat. No. 6,283,887. Application Ser. No. 09/512,960 claims priority from Provisional Application No. 60/123,451, filed Mar. 9, 1999.

BACKGROUND OF THE INVENTION

The present invention relates to a power transfer system for controlling the distribution of drive torque between the front and rear drivelines of a four-wheel drive vehicle.

Due to increased consumer demand for four-wheel drive vehicles, a plethora of different power transfer systems are currently utilized for directing power (i.e., drive torque) to all four wheels of the vehicle. For example, in many "part-time" power transfer systems, a transfer case is incorporated into the driveline and is normally operable in a two-wheel drive mode for delivering drive torque to the driven wheels. When four-wheel drive is desired, a "mode" shift mechanism can be selectively actuated by the vehicle operator for directly coupling the non-driven wheels to the driven wheels for establishing a part-time four-wheel drive mode. As will be appreciated, motor vehicles equipped with such a part-time power transfer systems offer the vehicle operator the option of selectively shifting between the two-wheel drive mode during normal road conditions and the part-time four-wheel drive mode for operation under adverse road conditions. An example of a part-time transfer case is disclosed in commonly-owned U.S. Pat. No. 4,770,280 to Frost.

Alternatively, it is known to use "on-demand" power transfer systems for automatically directing power to the non-driven wheels, without any input or action on the part of the vehicle operator, when traction is lost at the driven wheels. Modernly, the "ondemand" feature is incorporated into the transfer case by replacing the mode shift mechanism with a clutch assembly that is interactively associated with an electronic control system and a sensor arrangement. During normal road conditions, the clutch assembly is maintained in a non-actuated condition such that drive torque is only delivered to the driven wheels. However, when the sensors detect a low traction condition at the driven wheels, the clutch assembly is automatically actuated to deliver drive torque "on-demand" to the non-driven wheels. Moreover, the amount of drive torque transferred through the clutch assembly to the non-driven wheels can be varied as a function of specific vehicle dynamics, as detected by the sensor arrangement. One example of such an "on-demand" power transfer system is disclosed in commonly-owned U.S. Pat. No. 5,323,871 to Wilson et al wherein the electronically-controlled clutch assembly is operable for automatically controlling the amount of drive torque transferred to the non-driven wheels as a function of the wheel speed difference (i.e., the wheel slip) between the driven and non-driven wheels.

As a further alternative, some vehicles are equipped with full-time power transfer systems having a transfer case equipped with a center differential that functions to permit interaxle speed differentiation while transferring drive torque to both of the front and rear drivelines. To minimize loss of traction due to wheel slippage, many full-time transfer cases are also equipped with a clutch assembly for limiting speed differentiation and biasing the torque transferred across the center differential. For example, full-time transfer cases are disclosed in commonly-owned U.S. Pat. No. 5,697,861 to Wilson and U.S. Pat. No. 5,702,321 to Bakowski et al. which are respectively equipped with mechanically-actuated and hydraulically-actuated clutch assemblies for controllably modulating the drive torque delivered across the center differential to the front and rear drivelines.

While the power transfer systems disclosed above have advanced the technology associated with four-wheel drive motor vehicles, a need still exists to develop alternative arrangements which continue to provide improvements in packaging, response time and cost.

SUMMARY OF THE INVENTION

It is therefore an object of the present invention to provide improved power transfer systems for use in four-wheel drive vehicles having a transfer case equipped with a limited slip interaxle differential for controlling the torque delivered to the front and rear drivelines in response to changing vehicle conditions.

In accordance with one specific object of the present invention, a full-time power transfer system is disclosed to include a transfer case having a limited slip interaxle differential arranged to control speed differentiation and torque biasing across the front and rear drivelines for establishing a full-time four-wheel drive mode.

In accordance with a related object of the present invention, the full-time power transfer system may further include means for establishing a locked four-wheel drive mode in addition to the full-time four-wheel drive mode. To this end, a mode select mechanism is provided for permitting the vehicle operator to select one of the full-time and locked four-wheel drive modes and generate a mode signal indicative thereof. The mode signal is delivered to a controller for use in controlling actuation of a clutch assembly. When the locked four-wheel drive mode is selected, the clutch assembly prevents speed differentiation across the interaxle differential and thereby delivers non-differentiated drive torque to the front and rear drivelines. Thus, the power transfer system of the present invention offers the vehicle operator the option of selecting the specific four-wheel drive mode best-suited for operating the motor vehicle during normal or adverse road conditions as well as for off-road use.

As a further feature of the present invention, the full-time transfer case can be equipped with a gear reduction unit and a synchronized range shift mechanism that permit "on-the-move" shifting between high-range and low-range drive modes. Accordingly, the synchronized range shift mechanism permits the vehicle operator to shift the transfer case between the high-range and low-range drive modes without stopping the vehicle.

BRIEF DESCRIPTION OF THE DRAWINGS

Further objects, features and advantages of the present invention will become apparent to those skilled in the art from analysis of the following written description, the accompanying drawings and the appended claims in which:

DETAILED DESCRIPTION OF THE INVENTION

Figure 1:
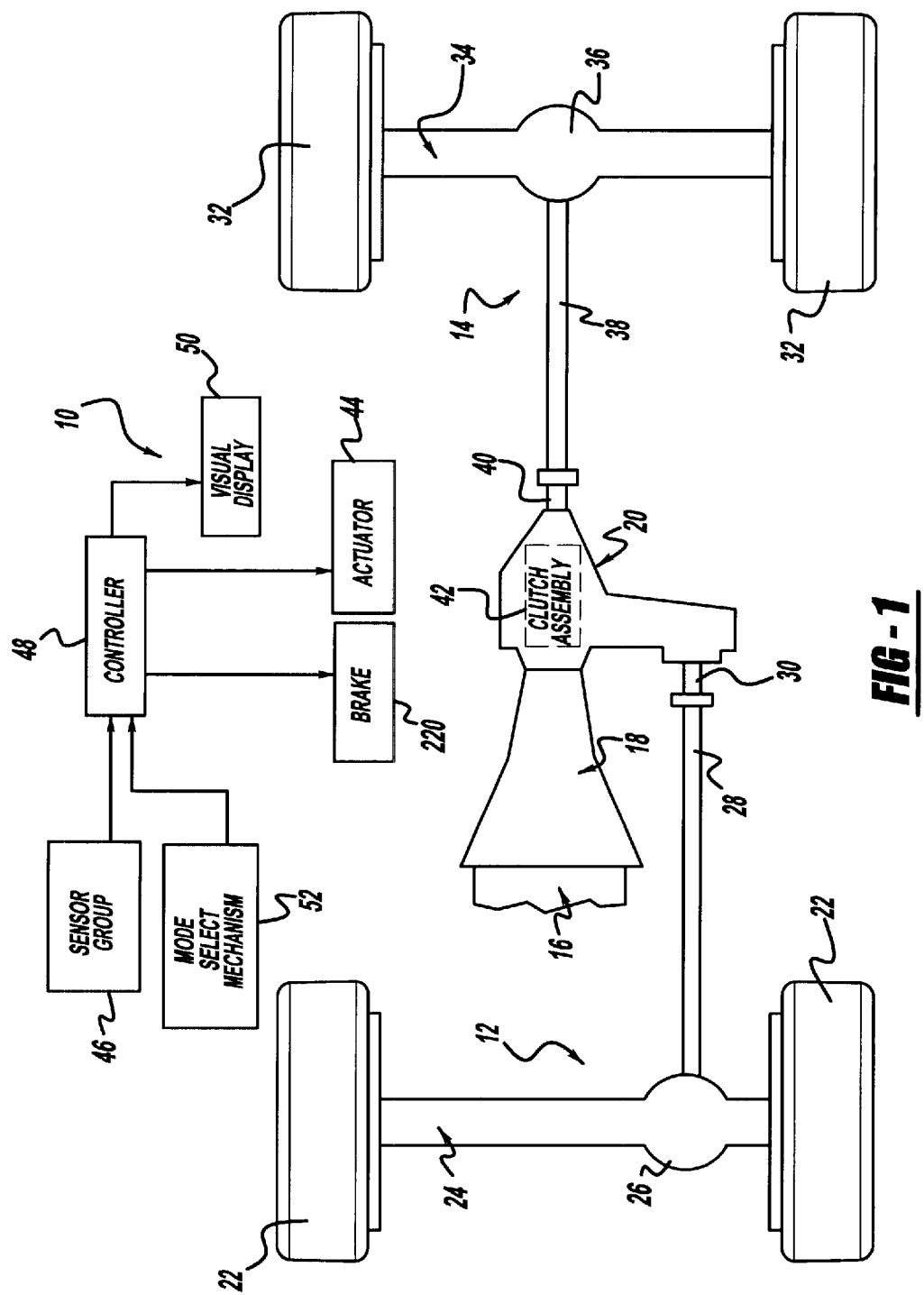
FIG. 1 is a schematic representation of a four-wheel drive motor vehicle equipped with the power transfer systems of the present invention.

Referring now to the drawings, a drivetrain for a four-wheel drive vehicle is schematically shown interactively associated with a power transfer system 10 of the present invention. The motor vehicle drivetrain includes a front driveline 12 and a rear driveline 14 both driveable from a source of power, such as an engine 16, through a transmission 18 which may be of either the manual or automatic type. In the particular embodiment shown, the drivetrain includes a transfer case 20 for transmitting drive torque from engine 16 and transmission 18 to front driveline 12 and rear driveline 14. Front driveline 12 includes a pair of front wheels 22 connected at opposite ends of a front axle assembly 24 having a front differential 26 that is coupled to one end of a front drive shaft 28, the opposite end of which is coupled to a front output shaft 30 of transfer case 20. Similarly, rear driveline 14 includes a pair of rear wheels 32 connected at opposite ends of a rear axle assembly 34 having a rear differential 36 coupled to one end of a rear drive shaft 38, the opposite end of which is interconnected to a rear output shaft 40 of transfer case 20. As will be detailed hereinafter with greater specificity, transfer case 20 is equipped with an electronically-controlled mode clutch 42 that is operable to control the magnitude of speed differentiation and torque distribution between output shafts 30 and 40.

Power transfer system 10 further includes a power-operated actuator assembly 44 for actuating mode clutch 42, a sensor group 46 for sensing specific dynamic and operational characteristics of the motor vehicle and generating sensor input signals indicative thereof, and a controller 48 for generating control signals in response to the sensor input signals. Moreover, controller 48 is adapted to control the actuated condition of mode clutch 42 by sending control signals to actuator assembly 44. As is schematically shown, controller 48 is also operable for illuminating a visual display 50 located within the passenger compartment for providing the vehicle operator with a visual indication of the operational status of power transfer system 10.

Power transfer system 10 also includes a mode select mechanism 52 for permitting the vehicle operator to select one of the available drive modes. In particular, controller 48 controls actuator assembly 44 in response to a mode signal sent to controller 48 from mode select mechanism 52 that is indicative of the particular mode selected. When an "adaptive" four-wheel drive mode is selected, controller 48 operates to continuously monitor and automatically regulate the actuated condition of mode clutch 42 between its non-actuated and fully-actuated limits for varying the magnitude of speed differentiation and torque transfer between output shafts 30 and 40. However, when the mode signal indicates that a "locked" four-wheel drive mode has been selected, mode clutch 42 is fully actuated, whereby non-differentiated power is delivered to output shafts 30 and 40. The locked four-wheel drive mode is provided for permitting improved traction when the motor vehicle is operated off-road or on severe road conditions.

Figure 2:
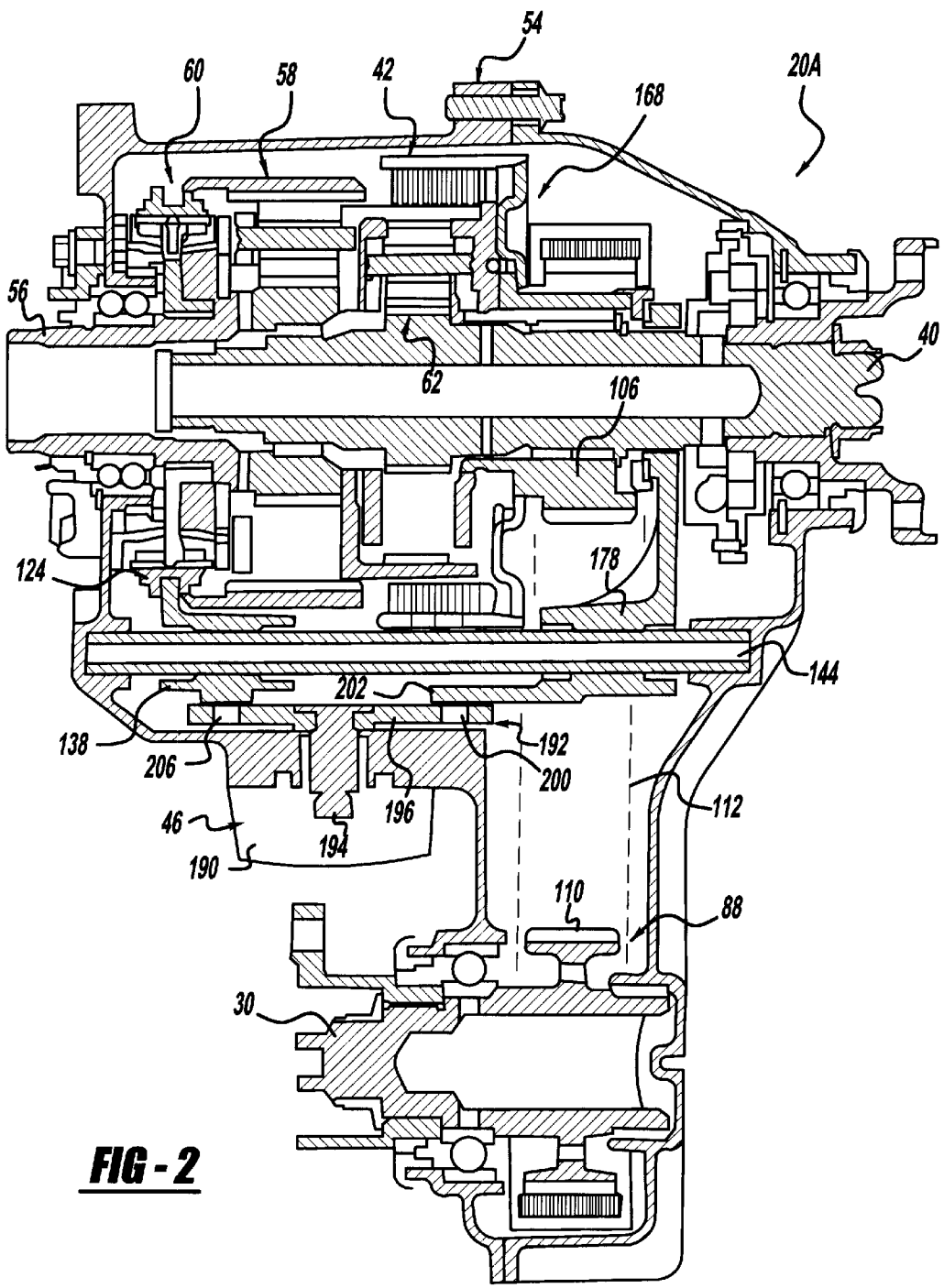
FIG. 2 is a sectional view of a two-speed full-time transfer case constructed according to one preferred embodiment of the present invention.
Figure 3:
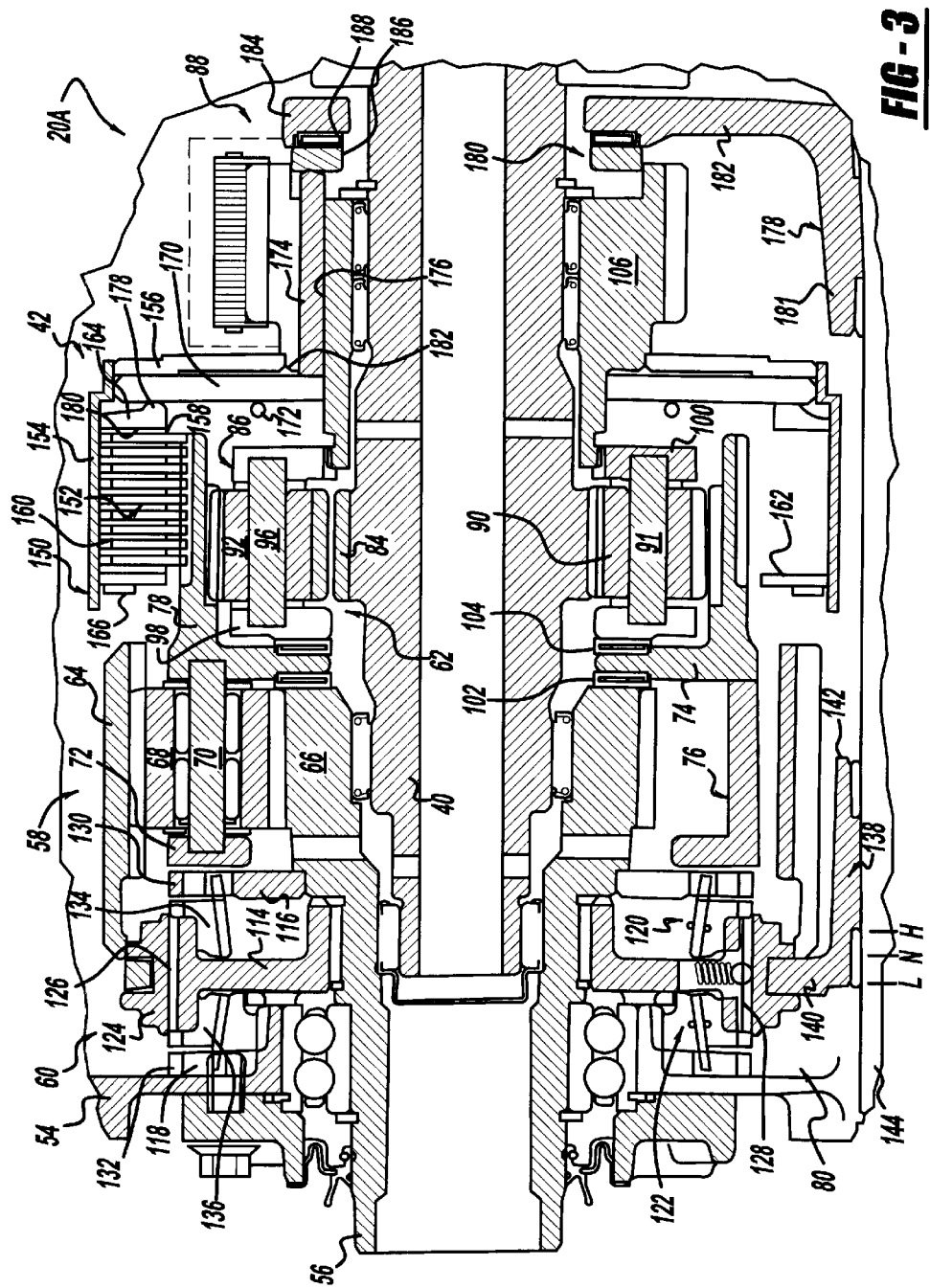
FIG. 3 is an enlarged partial sectional view taken from FIG. 2 showing the components in greater detail.
Figure 4:
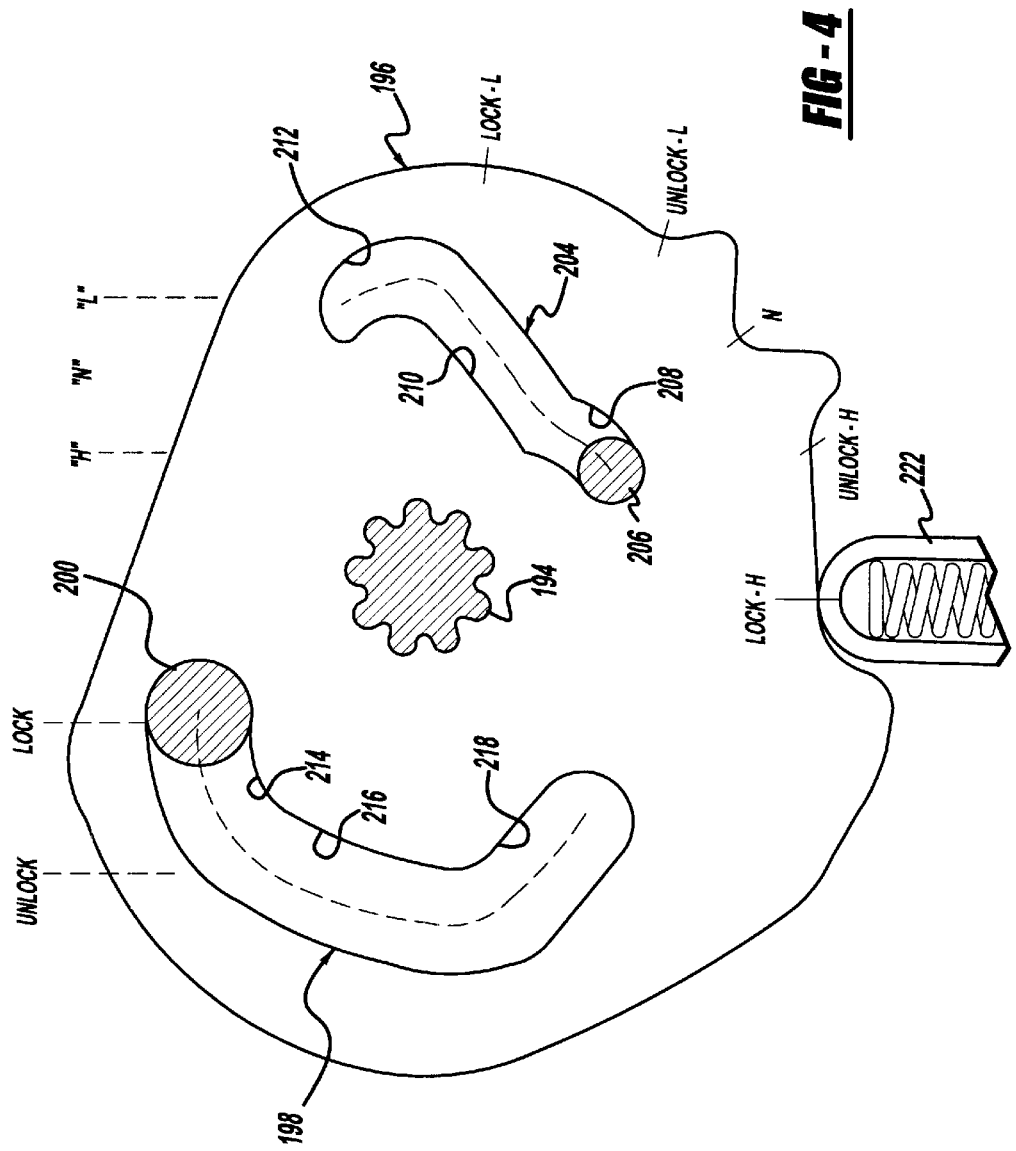
FIG. 4 is a side view of a sector plate associated with the drive mechanism for controlling coordinated actuation of the synchronized range shift mechanism and the clutch assembly.

With particular reference now to FIGS. 2 through 4, a preferred construction for a full-time transfer case 20A will now be described. Transfer case 20A includes a housing assembly 54 and an input shaft 56 rotatably supported from housing assembly 54. Input shaft 56 is adapted for connection to an output shaft (not shown) of transmission 18 such that both are rotatably driven by engine 16 of the motor vehicle. As seen, rear output shaft 40 is rotatably supported between input shaft 56 and housing assembly 54 while front output shaft 30 is rotatably supported from housing assembly 54. In addition to clutch assembly 42, transfer case 20A is also shown to include a planetary gear assembly 58, a synchronized range shift mechanism 60, and an interaxle differential 62. Planetary gear assembly 58 includes a first ring gear 64, a first sun gear 66 fixed for rotation with input shaft 56, and a set of first pinion gears 68 which are each rotatably supported on a pinion shaft 70 and meshed with first sun gear 66 and first ring gear 64. Each pinion shaft 70 extends between a front carrier ring 72 and a rear carrier ring 74 which are interconnected to define a planet carrier 76. As seen, a second ring gear 78 extends from rear carrier ring 74 of planet carrier 76 and acts as the input to interaxle differential 62.

Planetary gear assembly 58 functions as a two-speed gear reduction unit which, in conjunction with a range clutch 80 associated with synchronized range shift mechanism 60, is operable to establish first and second drive connections between input shaft 56 and second ring gear 78. To establish the first drive connection, first ring gear 74 is coupled by range clutch 80 for common rotation with input shaft 46. Thus, the first drive connection defines a high-range drive mode in which planet carrier 76 and second ring gear 78 are driven at a first (i.e., direct) speed ratio with respect to input shaft 56. Likewise, the second drive connection is established by range clutch 80 coupling first ring gear 64 to housing assembly 54. Thus, the second drive connection defines a low-range drive mode in which planet carrier 76 and second ring gear 78 are driven at a second (i.e., reduced) speed ratio relative to input shaft 56. A Neutral mode is established when range clutch 80 uncouples first ring gear 64 from both input shaft 56 and housing assembly 54. As will be detailed, synchronized range shift mechanism 60 is operable for permitting transfer case 20A to be shifted "on-the-move" between its high-range and low-range drive modes.

Interaxle differential 62 functions to permit speed differentiation and distribute drive torque between front output shaft 30 and rear output shaft 40 so as to establish a differentiated or "full-time" four-wheel drive mode. As noted, second ring gear 78, when driven at either of the first and second speed ratios, acts as the input to interaxle differential 62. Interaxle differential 62 also includes a planetary gearset with outputs operably coupled to front output shaft 30 and rear output shaft 40. According to the particular embodiment shown, the gearset includes a second sun gear 84 fixed for rotation with rear output shaft 40, a pinion carrier 86 coupled via a transfer mechanism 88 for rotation with front output shaft 30, a set of second pinions 90 rotatably supported from pinion carrier 86 and meshed with second sun gear 84, and a set of third pinions 92 rotatably supported from pinion carrier 86 and meshed with second ring gear 78. In addition, pinions 90 and 92 are arranged in meshed pairs and are supported on corresponding pinion posts 94 and 96 which extend between a front carrier plate 98 and a rear carrier plate 100 that are interconnected to define pinion carrier 86. As seen, thrust bearings 102 and 104 locate rear carrier ring 74 for rotation relative to first sun gear 66 and front carrier plate 98. Transfer mechanism 88 includes a drive sprocket 106 rotatably supported on rear output shaft 40 and which has a tubular hub segment 108 splined to rear carrier plate 100 of pinion carrier 86. Transfer mechanism 88 also includes a driven sprocket 110 fixed to front output shaft 30, and a power transfer device, such as chain 112, which interconnects driven sprocket 110 to drive sprocket 106.

With continued reference to FIGS. 2 and 3, synchronized range shift mechanism 60 is shown to include a clutch hub 114 rotatably supported on input shaft 56, a first clutch plate 116 fixed to input shaft 56, a second clutch plate 118 fixed to housing assembly 54, a first synchronizer assembly 120 disposed between clutch hub 114 and first clutch plate 116, and a second synchronizer assembly 122 disposed between clutch hub 114 and second clutch plate 118. Range clutch 80 includes a range sleeve 124 having a set of internal clutch teeth 126 maintained in constant mesh with external teeth 128 formed on clutch hub 114. Furthermore, range sleeve 124 is fixed for rotation with first ring gear 74. With range sleeve 124 in a neutral position, as denoted by position line "N", its clutch teeth 126 are disengaged from meshed engagement with clutch teeth 130 on first clutch plate 116 and clutch teeth 132 on second clutch plate 118. First synchronizer assembly 120 is operable for causing speed synchronization between input shaft 56 and first ring gear 64 in response to movement of range sleeve 124 from its N position toward a high-range position, as denoted by position line "H". Once the speed synchronization process is completed, clutch teeth 126 on range sleeve 124 are permitted to move through the teeth of a blocker ring 134 and into meshed engagement with clutch teeth 130 on first clutch plate 116. Accordingly, with range sleeve 124 positioned in its H position, first ring gear 64 is coupled to first clutch plate 116, whereby second ring gear 78 of interaxle differential 62 is coupled to rotate at the same speed as input shaft 56 for establishing the first drive connection therebetween. Thus, when the first drive connection is established, transfer case 20A is operating in a four-wheel high-range drive mode.

Second synchronizer assembly 122 is operable to cause speed synchronization between first ring gear 64 and housing assembly 54 in response to movement of range sleeve 124 from its N position toward a low-range position, as denoted by position line "L". Once speed synchronization is complete, clutch teeth 126 on range sleeve 124 move through teeth on a blocker ring 136 and into meshed engagement with clutch teeth 132 on second clutch plate 118. With range sleeve 124 positioned in its L position, first ring gear 64 is braked against rotation such that first sun gear 66 drives first pinion gears 68 about stationary first ring gear 64, whereby planet carrier 76 and second ring gear 78 are driven at the reduced speed ratio relative to input shaft 56 for establishing the second drive connection. Thus, when the second drive connection is established, transfer case 20A is operating in a four-wheel low-range drive mode. When range sleeve 124 is in its N position, no drive torque is transferred to second ring gear 78, thereby establishing the Neutral mode.

To provide means for moving range sleeve 124 between its three distinct positions, synchronized range shift mechanism 60 further includes a range fork 138 having a projection 140 that is retained in a groove formed in range sleeve 124. Range fork 138 also includes a tubular segment 142 that is journalled for sliding axial movement on a shift rail 144, the opposite ends of which are supported in sockets formed in housing assembly 54. As will be described, transfer case 20A includes means for causing axial movement of range fork 138 and, in turn, range sleeve 124 between the three above-noted positions in response to controlled actuation of actuator assembly 44.

As best seen from FIG. 3, mode clutch 42 is arranged for controlling speed differentiation and torque biasing between second ring gear 78 and pinion carrier 86 of interaxle differential 62. Mode clutch 42 is a multi-plate friction clutch assembly which includes an outer drum 150 fixed for rotation with drive sprocket 106 and a clutch pack 152 operably installed between outer drum 150 and second ring gear 78. In particular, outer drum 150 includes a cylindrical drum housing 154 fixed (i.e., welded) to a housing plate 156 which, in turn, is fixed (i.e., welded) to drive sprocket 106. Clutch pack 152 includes a set of inner clutch plates 158 splined to second ring gear 78 which are alternately interleaved with a set of outer clutch plates 160 splined to drum housing 154. Clutch pack 152 is shown to be located between a reaction plate 162 splined to drum housing 154 and a pressure plate 164 journalled in drum housing 154. A snap ring 166 axially restrains and locates reaction plate 162 on drum housing 154. Movement of pressure plate 164 functions to vary the frictional compressive force exerted on clutch pack 152 for regulating speed differentiation and biasing the torque distribution between rear output shaft 40 and front output shaft 30.

With continued reference to FIGS. 2 and 3, mode clutch 42 is also shown to include a clutch actuation mechanism 168 for moving pressure plate 164 under the control of actuator assembly 44. Clutch actuation mechanism 168 includes a set of lever arms 170 disposed adjacent to housing plate 156, a return spring 172 engaging lever arms 170, and a set of thrust pins 174 retained in throughbores 176 formed in drive sprocket 106. Lever arms 170 are equidistant and are retained for pivotal movement in radial channels formed in drum plate 156. Throughbores 176 are equally-spaced in a circumferential arrangement and are aligned with the radial channels in drum plate 156. In a preferred arrangement, clutch actuation mechanism 168 includes a set of six lever arms 170 and thrust pins 174. As seen, an annular rim projection 178 on pressure plate 164 engages an upper front face 180 of each lever arm 170 while a first end of each thrust pin 174 engages a lower rear face 182 of a corresponding lever arm 170. Thus, axially sliding movement of thrust pins 174 in a first (i.e., forward) direction from a fully retracted position to a fully extended position causes lever arms 170 to pivot, in opposition to the biasing of return spring 172, from a first position to a second position. With lever arms 170 in the first position, pressure plate 164 exerts a predetermined minimum clutch engagement force on clutch pack 152. In contrast, when lever arms 170 are in the second position, pressure plate 164 exerts a predetermined maximum clutch engagement force on clutch pack 152.

To provide means for moving thrust pins 174 between the fully retracted and extended positions, clutch actuation mechanism 168 further includes a mode fork 178 and a thrust bearing assembly 180. Mode fork 178 has a tubular segment 181 journalled on shift rail 144 and an arm segment 182 with an end portion 184 at least partially surrounding rear output shaft 40. Thrust bearing assembly 180 includes a thrust ring 186 and a bearing assembly 188 disposed between thrust ring 186 and end portion 184 of arm segment 182 on mode fork 178. As seen, the second end of each thrust pin 174 engages thrust ring 186. Thus, axial movement of mode fork 178 on shift rail 144 causes corresponding axial movement of thrust pins 174 which, as noted, functions to control actuation of clutch assembly 42.

Preferably, actuator assembly 44 includes a rotary actuator, such as an electric gearmotor 190, which is operable for generating an output torque, the value of which varies as a function of the magnitude of the electrical control signal applied thereto by controller 48. To provide means for selectively controlling the magnitude of the clutch engagement force exerted on clutch pack 152, actuator assembly 46 further includes a drive mechanism 192. Drive mechanism 192 is interconnected to a rotary output member 194 of gearmotor 190 for changing its output torque into an axially-directed force that is used for controlling axial movement of range sleeve 124 and mode fork 178. According to a preferred construction, drive mechanism 192 includes a sector plate 196 that is rotatably driven through a range of angular motion by output member 194 of gearmotor 190. As will be detailed, sector plate 196 is operable for causing coordinated axial movement of range sleeve 124 and mode fork 178 for establishing several different drive modes.

To generate axial movement of mode fork 178, sector plate 196 includes a mode slot 198 within which a mode pin 200 is retained. Mode pin 200 is fixed to a flange section 202 of mode fork 178. The contour of mode slot 198 is configured to cause the desired direction and amount of axial movement of mode fork 178 in response to rotation of sector plate 196 for generating the desired clutch engagement force. To control axial movement of range sleeve 124, sector plate 196 also has a range slot 204 within which a range pin 206 extends. Range pin 206 is fixed to tubular segment 142 of range fork 138. As such, the contour of range slot 204 is configured to cause controlled axial movement of range sleeve 124 in response to controlled rotation of sector plate 196.

From FIG. 4, it can be seen that sector plate 196 may be rotated about an axis 208 to any one of five distinct sector positions, as labelled "LOCK-H", "UNLOCK-H", "N", "UNLOCK-L", and "LOCK-L". As will be detailed, transfer case 20A is operable for establishing at least five distinct operative modes, namely, a locked four-wheel high-range drive mode, a full-time four-wheel high-range drive mode, a Neutral non-driven mode, a full-time four-wheel low-range drive mode, and a locked four-wheel low-range drive mode. The particular operational mode selected is established by the position of mode pin 200 in mode slot 198 and the position of range pin 206 in range slot 204. In operation, the vehicle operator selects a desired drive mode via actuation of mode select mechanism 52 which, in turn, sends a mode signal to controller 48 that is indicative of the selection. Thereafter, controller 48 generates an electric control signal that is applied to gearmotor 190 for controlling the rotated position of sector plate 196. More particularly, upon selection of the locked four-wheel high-range drive mode, the Neutral mode or the locked four-wheel low-range drive mode, sector plate 196 is controllably rotated to each mode's predefined sector position, namely LOCK-H, N, or LOCK-L. However, when either of the full-time four-wheel high-range or low-range drive modes is selected, power transfer system 10 is operable for modulating the clutch engagement force applied to clutch pack 152 of mode clutch 42 as a function of the various sensor input signals. Mode select mechanism 52 can take the form of any mode selector device which is under the control of the vehicle operator for generating a mode signal indicative of the specific mode selected. In one form, the mode selector device may be an array of dash-mounted push button switches. Alternatively, the mode selector device may be a manually-operable shift lever sequentially movable between a plurality positions corresponding to the available operational modes which, in conjunction with a suitable electrical switch arrangement, generates a mode signal indicating the mode selected. In either form, mode select mechanism offers the vehicle operator the option of deliberately choosing between the various operative drive modes.

With continued reference to FIG. 4, the contour of range slot 204 and mode slot 198 are defined in greater detail. In particular, the contour of range slot 204 is defined by first, second and third cam pathways 208, 210 and 212, respectively, which correspond to fourth, fifth and sixth cam pathways 214, 216 and 218, respectively, associated with mode slot 198. In the LOCK-H sector position shown, mode pin 200 is positioned within mode slot 198 in proximity to the terminal end of fourth cam pathway 214 for locating mode fork 178 in a locked position, as denoted by position line "LOCK". With mode fork 178 in this position, thrust pins 174 have been moved to their fully extended position and lever arms 170 has been pivoted to their second position. As such, the maximum clutch engagement force is exerted on clutch pack 152 and mode clutch 42 is considered to be operating in a fully-actuated (i.e., locked-up) condition. In addition, range pin 206 is shown positioned within range slot 204 in proximity to the terminal end of first cam pathway 208 for positioning range sleeve 124 in its H position. Accordingly, when mode select mechanism 52 signals that the vehicle operator has selected the locked four-wheel high-range drive mode, controller 48 sends a control signal to gearmotor 190 to rotate sector plate 196 to the LOCK-H sector position. To provide means for holding sector plate 196 in its LOCK-H sector position, power transfer system 10 also includes a brake 220, as schematically shown in FIG. 1. Brake 220 is an electrically-controlled spring-applied device that is operable in a "power-off" condition for braking rotation of gearmotor output member 194. During controlled rotation of sector plate 196, an electrical signal from controller 48 maintains brake 220 in its "power-on" condition. However, once sector plate 196 has been rotated to its LOCK-H position, power to brake 220 is interrupted to shift it into its power-off condition, thereby locking sector plate 196 against rotation.

If mode select mechanism 52 thereafter signals selection of the full-time four-wheel high-range drive mode, gearmotor 190 is actuated for rotating sector plate 196 from the LOCK-H sector position toward its UNLOCK-H sector position, whereby the contour of fourth cam pathway 214 in mode slot 198 causes axial displacement of mode pin 200 which, in turn, causes movement of mode fork 178 from the LOCK position toward an unlocked position, as denoted by position line "UNLOCK". Such movement of mode fork 178 permits return spring 172 to urge lever arms 170 toward the first position which, in turn, moves thrust pins 174 toward the fully retracted position, thereby causing a proportional decrease in the clutch engagement force exerted on clutch pack 152. During such rotation of sector plate 196, the contour of first cam pathway 208 maintains range sleeve 124 in its H position. Moreover, once mode fork 178 is in its UNLOCK position, lever arms 170 are located in the first position and mode clutch 42 is considered to be in a non-actuated condition, thereby permitting unrestricted speed differentiation between front and rear drivelines 12 and 14, respectively.

According to the present invention, when transfer case 20A is operating in its full-time four-wheel high-range drive mode, electronically-controlled mode clutch 42 is active for providing adaptive control of speed differentiation and torque biasing across interaxle differential 62. Specifically, the actuated state of gearmotor 190 is continuously monitored and modulated in accordance with specific predefined relationships established based on the current value of the sensor input signals. Thus, in the full-time four-wheel high-range drive mode, power transfer system 10 acts as an adaptive system for continuously monitoring and automatically regulating the actuated condition of clutch assembly 42 in a manner that is independent of any deliberate action by the vehicle operator. The magnitude of clutch actuation is defined between the limits of bi-directional rotation of sector plate 196 between its LOCK-H and UNLOCK-H sector positions.

Power transfer system 10 is also operable to permit transfer case 20A to be shifted out of either of the locked and full-time four-wheel high-range drive modes and into the Neutral mode. Specifically, upon mode select mechanism 52 signalling selection of the Neutral mode, gearmotor 190 is actuated for causing sector plate 196 to rotate to its N sector position, whereby mode pin 200 is positioned within fifth cam pathway 216 of mode slot 198 and range pin 206 is positioned within second cam pathway 210 of range slot 204. The contour of fifth cam pathway 216 is designed to retain mode fork 178 in its UNLOCK position, whereby clutch assembly 42 is maintained in the non-actuated condition. However, range pin 206 is axially displaced due to the contour of second cam pathway 210 for shifting range sleeve 124 from its H position into its N position.

Thereafter, if the full-time four-wheel low-range drive mode is selected, sector plate 196 is initially rotated to its UNLOCK-L sector position. Upon such movement, mode pin 200 is guided in fifth cam pathway 216 of mode slot 198 for maintaining mode fork 178 in its UNLOCK position while range pin 206 is guided within second cam pathway 210 to axial shift range sleeve 124 into its L position. Thus, during "range" shifting of range sleeve 124 between its three distinct positions, sector plate 196 is configured to maintain mode clutch 42 in its non-actuated condition. Preferably, automatic clutch control in the full-time four-wheel low-range drive mode is similar to that disclosed above for operation in the full-time four-wheel high-range drive mode, wherein gearmotor 190 is actuated in accordance with specific predefined relationships established based on the current value of the sensor input signals for rotating sector plate 196 to a position between the limit of its UNLOCK-L and LOCK-L sector positions. As such, mode clutch 42 is non-actuated when sector plate 196 is in its UNLOCK-L sector position and is fully-actuated when sector plate 196 is in its LOCK-L sector position. Accordingly, the modulation range is established between the limits of bi-directional rotation of sector plate 196 between its UNLOCK-L and LOCK-L sector positions for causing movement of mode pin 200 within sixth cam pathway 218 of mode slot 198 for moving mode fork 178 between its UNLOCK and LOCK positions while range sleeve 124 is maintained in its L position due to the contour of third cam pathway 212.

Finally, transfer case 20A can be shifted into its locked four-wheel low-range drive mode by causing sector plate 196 to be rotated to its LOCK-L sector position. In this position, mode pin 200 is positioned in sixth cam pathway 218 in proximity to its terminal end for locating mode fork 178 in its LOCK position while range pin 206 is located in proximity to the terminal end of third cam pathway 212 for positioning range sleeve 124 in its L position. Again, brake 220 is thereafter shifted into its power-off condition for mechanically locking sector plate 196 in its LOCK-L sector position. A spring-biased poppet assembly 222 is provided for generating a signal supplied to controller 48 that is indicative of the rotated position of sector plate 196. Those skilled in the art will understand that gearmotor 190 is operable to rotate sector plate 196 in both directions to facilitate shifting between any available modes during motive operation of the motor vehicle. Moreover, while power transfer system 10 is disclosed to provide five different operative modes, in some applications it may be decided to limit the selection of available drive modes. For example, it is contemplated that mode select mechanism 52 could be easily adapted to permit selection of three drive modes, namely, the full-time four-wheel high-range drive mode, the Neutral mode, and the locked four-wheel low-range drive mode. However, those skilled in the art will recognize that the above-described structure for sector plate 196 would still be applicable.

Figure 5:
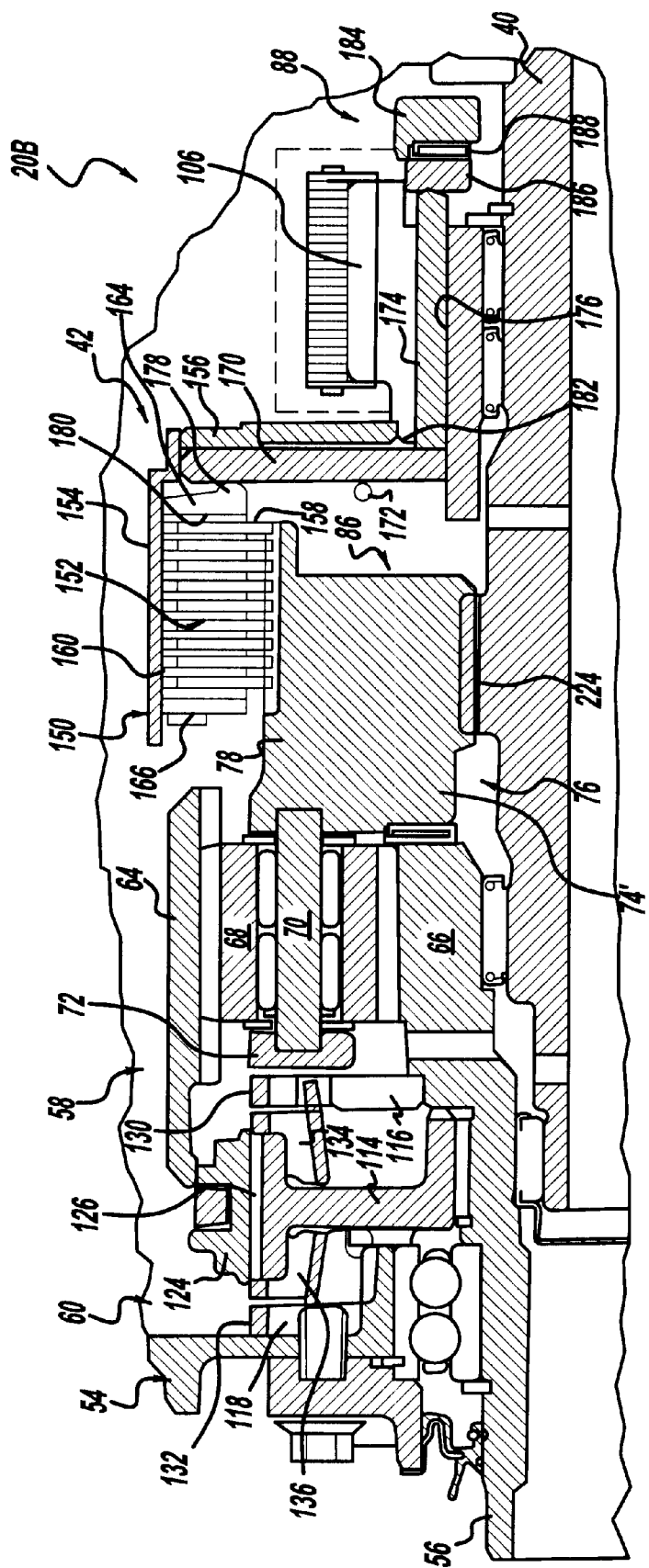
FIG. 5 is a partial sectional view of a two-speed on-demand transfer case constructed according to another preferred embodiment of the present invention.

With particular reference now to FIG. 5, a transfer case 20B is shown which is a modified version of transfer case 20A with interaxle differential 62 removed to define an "on-demand" power transfer system. Transfer case 20B is operable to make available at least six different drive modes including a two-wheel high-range drive mode, an on-demand four-wheel high-range drive mode, a part-time high-range drive mode, a Neutral mode, an on-demand four-wheel low-range drive mode, and a part-time four-wheel low-range drive mode. To provide these operational modes, rear carrier ring 74' of planet carrier 76 is shown fixed via a splined connection 224 to rear output shaft 40. As such, drive torque is transferred from planetary gear assembly 58 to rear output shaft 40 to define the high-range, Neutral and low-range modes while mode clutch 42 is arranged to transfer drive torque from rear output shaft 40 to front output shaft 30 for establishing the available two-wheel and four-wheel drive modes.

When the part-time four-wheel high-range drive mode is selected, gearmotor 190 rotates sector plate 196 to its LOCK-H sector position such that mode clutch 42 is fully-actuated and range sleeve 124 is located in its H position. Thereafter, brake 220 is shifted into its power-off condition to hold sector plate 196 in its LOCK-H position. As such, mode clutch 42 acts to couple front output shaft 30 for common rotation with rear output shaft 40.

When the two-wheel high-range drive mode is selected, gearmotor 190 rotates sector plate 196 to its UNLOCK-H sector position such that mode clutch 42 is released with range sleeve 124 located in its H position. As such, all drive torque is transmitted to rear output shaft 40. Typically, a wheel or axle disconnect system (not shown) under the control of controller 48 would be actuated to disconnect front drive shaft 28 from driven connection with front wheels 22 when the two-wheel drive mode is selected.

When the on-demand four-wheel high-range drive mode is selected, electronically-controlled mode clutch 42 is active for providing adaptive control of the torque transfer from rear output shaft 40 to front output shaft 30. The actuated state of gearmotor 190 is continuously monitored and modulated according to predefined relationships established based on the sensor input signals for automatically regulating the actuated state of mode clutch 42. Thus, the magnitude of clutch actuation is defined between the limits of bi-directional rotation of sector plate 196 between its UNLOCK-H and LOCK-H sector positions. Furthermore, when the Neutral mode is selected, sector plate 196 is rotated to its N sector position and no drive torque is delivered to either output shaft.

When the on-demand four-wheel low-range drive mode is selected, gearmotor 190 initially rotates sector plate 196 to its UNLOCK-L sector position. Thereafter, electronically-controlled mode clutch 42 is active for providing adaptive control of the torque transfer from rear output shaft 40 to front output shaft 30. Such adaptive control is provided by controlling the position of sector plate 196 between its UNLOCK-L and LOCK-L sector positions in accordance with specific predefined relationships established based on the current values of the sensor input signals sent to controller 48. Finally, transfer case 20B can be shifted into its part-time four-wheel low-range drive mode by rotating sector plate 196 to its LOCK-L sector position to fully-actuated mode clutch 42 and locate range sleeve 124 in its L position. Again, brake 220 will be shifted into its power-off condition for locking sector plate 196 in its LOCK-L sector position. While six different modes were disclosed for transfer case 20B, it is contemplated that various combinations of these drive modes could be made available based on a particular vehicular application.

Figure 6:
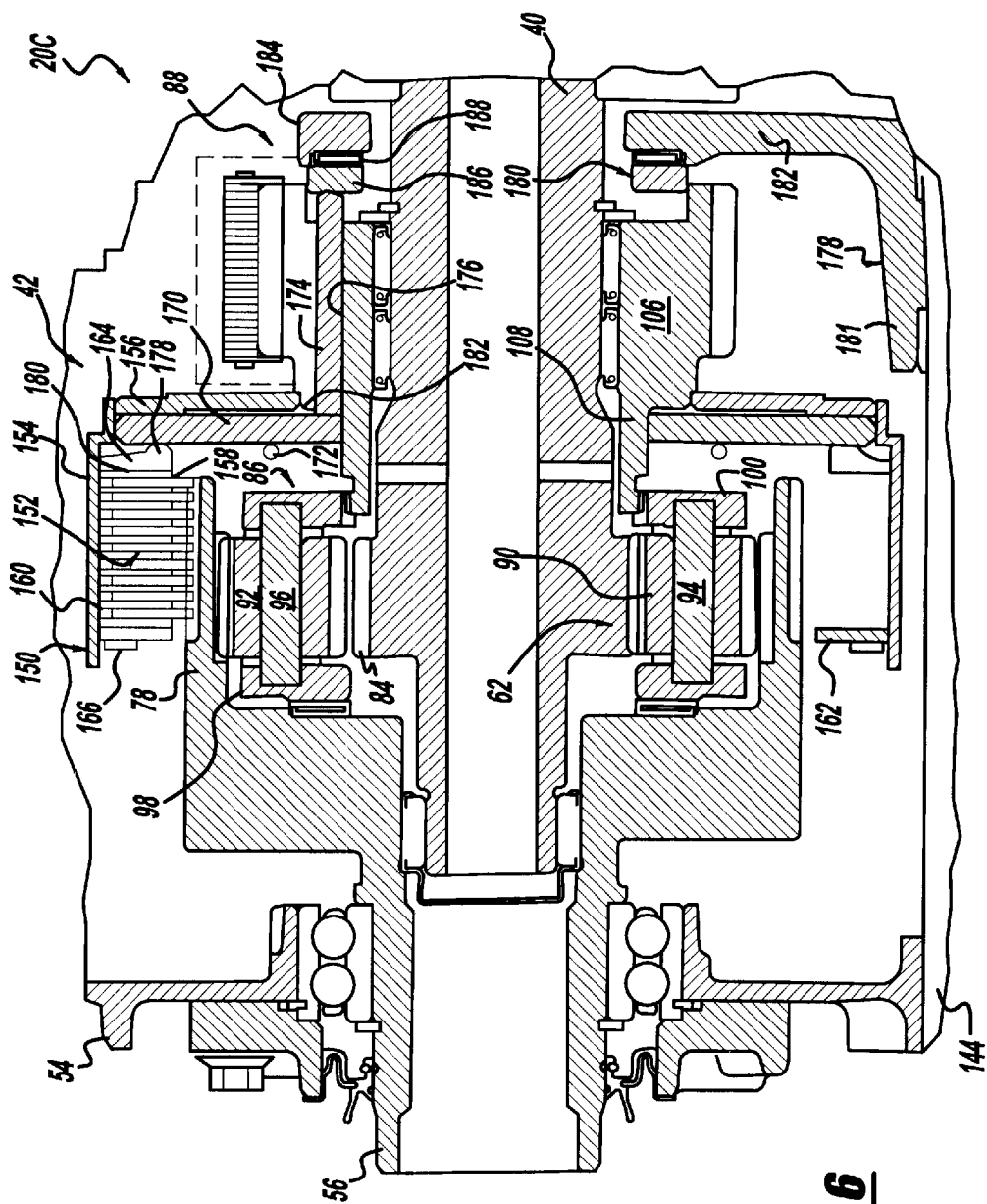
FIG. 6 is a partial sectional view of a single-speed full-time transfer case constructed according to yet another preferred embodiment of the present invention.

Turning now to FIG. 6, a single-speed full-time transfer case 20C is shown which is generally similar to transfer case 20A with the exception that planetary gearset 58 and synchronized range shift mechanism 60 have been eliminated. As such, sun gear 78 is directly driven by input shaft 56. Transfer case 20C permits establishment of at least two distinct operative modes including a locked four-wheel drive mode and a fulltime four-wheel drive mode. A modified version of sector plate 196 would be used with range slot 204 eliminated and mode slot 198 contoured to only move mode fork 178 between its locked and unlocked positions. As before, selection of the full-time four-wheel drive mode results in adaptive control of clutch assembly 42 for automatically regulating speed differentiation and torque biasing across interaxle differential 62, while selection of the locked four-wheel drive mode acts to lock interaxle differential 62. It will be further appreciated that a single-speed version of on-demand transfer case 20B can likewise be provided in accordance with the present invention.

Figure 7:
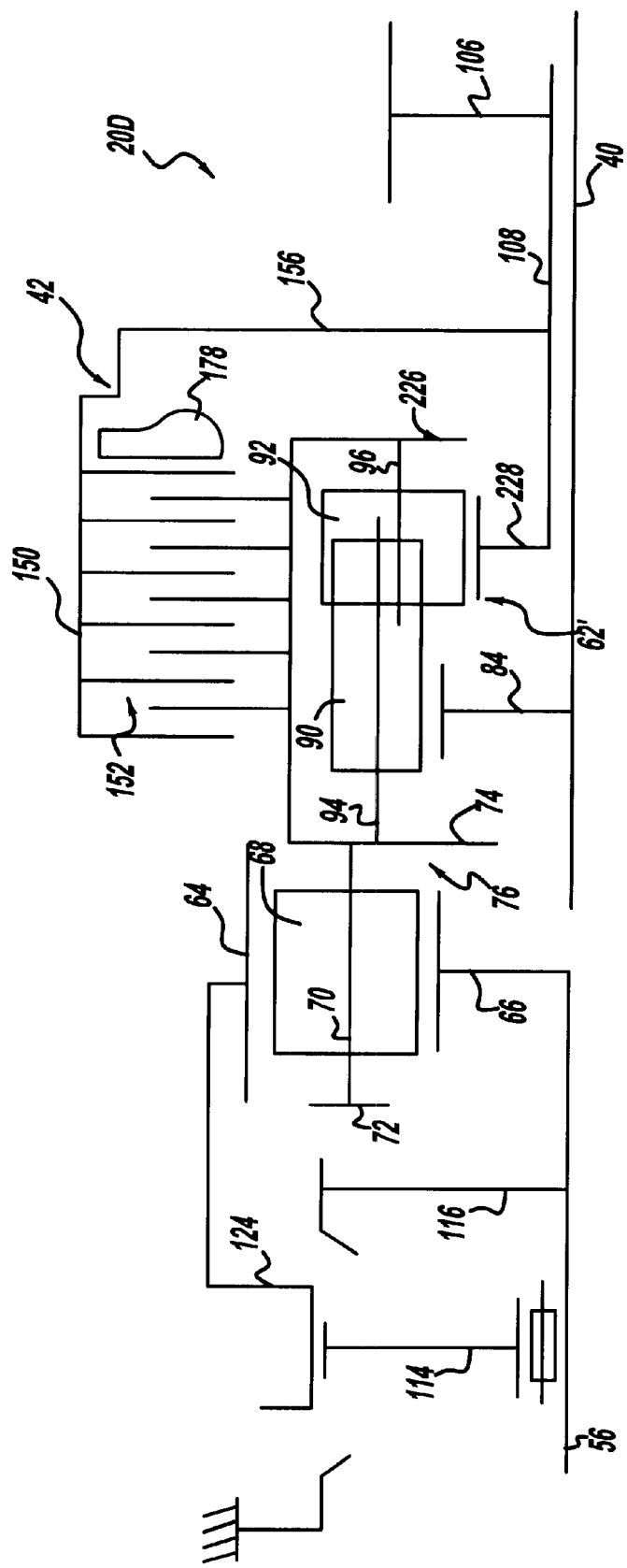
FIG. 7 is a partial schematic view of a two-speed full-time transfer case equipped with a modified interaxle differential.

Referring now to FIG. 7, a transfer case 20D is partially shown schematically to include an interaxle differential 62' which can be used in substitution for interaxle differential 62 in any of the full-time transfer cases disclosed above. In particular, planet carrier 76 of planetary gear assembly 58 is connected to a pinion carrier 226 of interaxle differential 62' to define a carrier assembly. The gearset associated with interaxle differential 62' includes second sun gear 84 which is fixed for rotation with rear output shaft 40, a third sun gear 228 which is fixed to hub segment 108 for rotation with drive sprocket 106, a set of second pinions 90 rotatably supported on pinion posts 94 secured to pinion carrier 226 and that are meshed with second sun gear 84, and a set of third pinions 92 rotatably supported on pinion posts 96 secured to pinion carrier 226 and which are meshed with third sun gear 228. As before, pinions 90 and 94 are arranged in meshed pairs. In transfer case 20D, clutch pack 152 of mode clutch 42 is operably installed between pinion carrier 226 and drum 150. Thus, pinion carrier 226 acts as the input to differential 62' while sun gears 84 and 228 act as its outputs.

Figure 8:
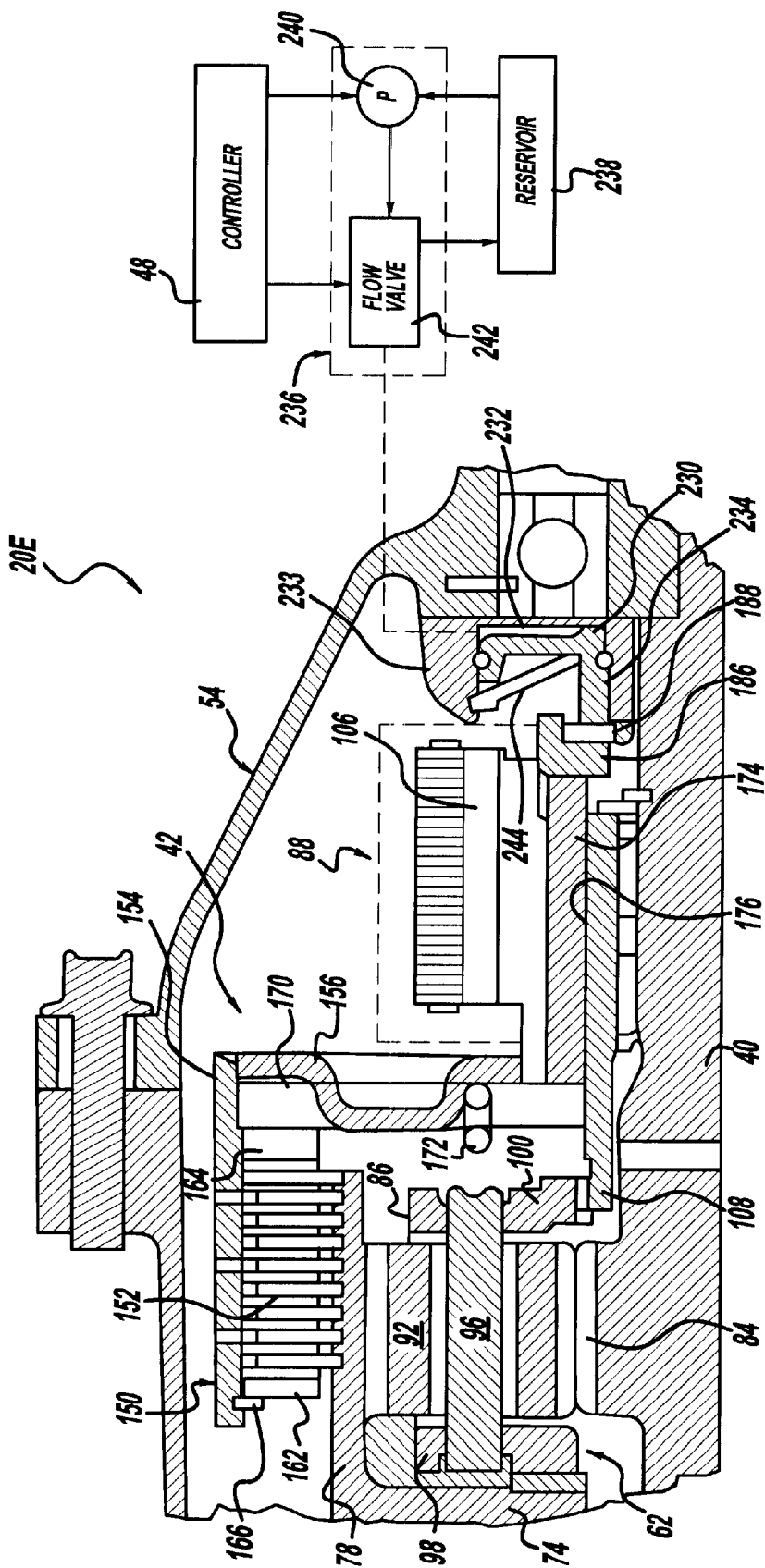
FIG. 8 is a partial sectional view showing an alternative clutch actuation system for use with any of the full-time and on-demand transfer cases of the present invention.

With respect to any of the full-time and on-demand power transfer systems, it is contemplated that actuator assembly 44 could comprise various alternatives to the gearmotor/sector plate system disclosed. For example, a linear actuator could be used to axially move mode fork 178 between its UNLOCK and LOCK positions which, as noted, causes corresponding movement of thrust pins 174 between the fully retracted and extended positions. Alternatively, a ball-ramp type of thrust assembly that is actuated by a electro-magnetic actuator could be used to move thrust pins 174. One specific example of an alternative arrangement is shown in FIG. 8 which shows a full-time transfer case 20E which is a modified version of transfer cases 20A and 20C. In particular, mode fork 178 has been replaced with a piston 230 that is positioned in, and sealed relative to, an annular pressure chamber 232 formed in a piston housing 233 fixed to housing assembly 54. Piston 230 is shown to include an axial hub 234 which acts on bearing assembly 188. As schematically shown, a second actuator assembly 236 is provided to regulate the pressure of hydraulic fluid delivered from a reservoir 238 to pressure chamber 232 for controlling the axial position of piston 230 which, in turn, controls the axial position of thrust pins 174. Thus, the fluid pressure in pressure chamber 232 is adjustably controlled to regulate the actuated condition of mode clutch 42. More specifically, when a predetermined minimum fluid pressure is supplied to pressure chamber 232, lever arms 170 are located in the first position. In contrast, a predetermined maximum fluid pressure in pressure chamber 232 functions to position lever arms 170 in the second position. Thus, all of the different drive modes discussed above for full-time transfer case 20A are available with the hydraulic clutch actuation system provided for transfer case 20E. Obviously, this hydraulic clutch actuation system is likewise applicable for use with on-demand transfer case 20B to establish all of its available drive modes.

If transfer case 20E is equipped with planetary gear assembly 58, then gearmotor 190 and sector plate 196 are still provided for controlling on-the-move range shifting of range sleeve 124. Second actuator assembly 236 can be mounted to housing assembly 54 or, alternatively, can be located remotely therefrom. Likewise, reservoir 238 can be an internal sump in housing assembly 54 or an external fluid supply. While not specifically limited thereto, second actuator assembly 236 is shown to include a pump 240 and a flow control valve 242 which are supplied with control signals from controller 48. A return spring 244 is provided for normally urging piston 230 to a retracted position within pressure chamber 232. As a further alternative, pump 240 can be a shaft driven device, such as a gerotor-type gear pump, in which the output pressure generated and supplied to pressure chamber 232 is proportional to the speed difference between output shafts 30 and 40. With such a shaft-driven pump, the position of piston 230 and the clutch engagement force exerted on clutch pack 152 is progressive and generally proportional to the speed difference.

Figure 9:
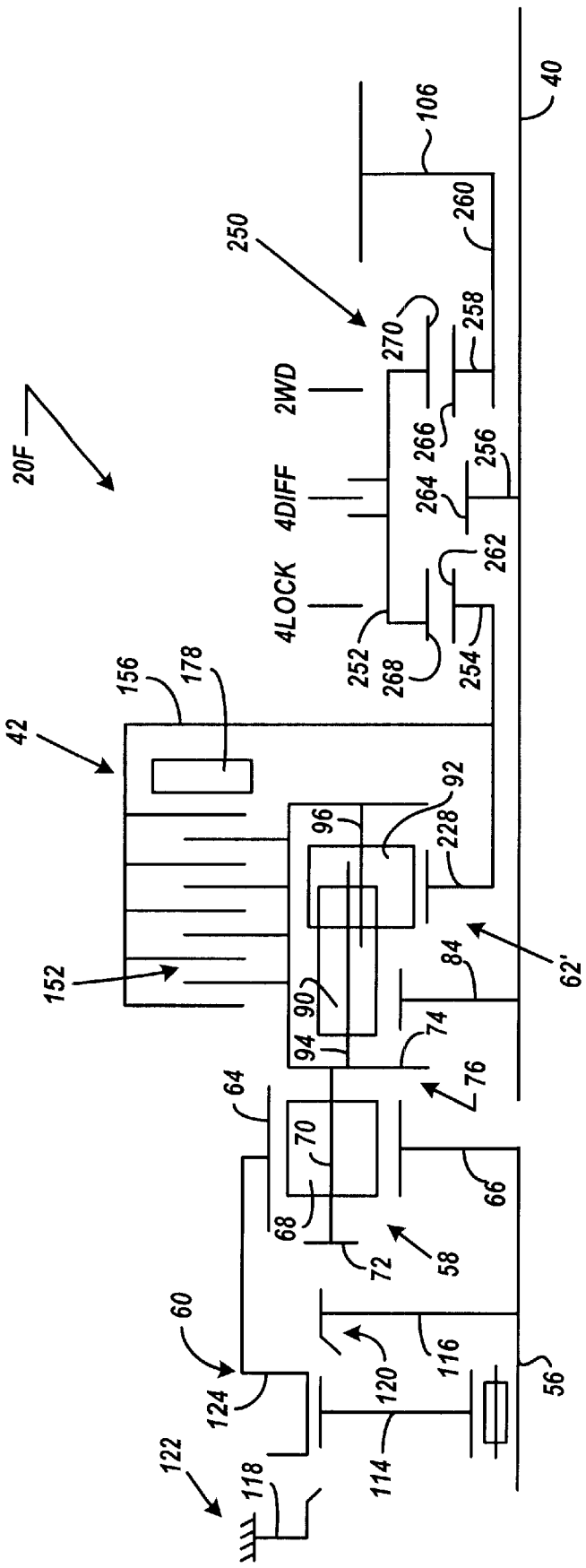
FIG. 9 is a partial schematic view of a two-speed full-time transfer case equipped with a lock-out clutch mechanism.

Referring now to FIG. 9, a transfer case 20F is partially shown in a schematic illustration and which is generally similar to transfer case 20D of FIG. 7 with the exception that a lock-out clutch 250 has been added in association with interaxle differential 62'. Lock-out clutch 250 provides the advantageous feature of enabling a two-wheel drive mode in addition to the full-time and locked four-wheel drive modes available to transfer case 20D. In addition, lock-out clutch 250 establishes a mechanical coupling across differential 62' when either of the locked four-wheel high-range and low-range drive modes are established so as to permit gearmotor 190 of actuator assembly 44 to be turned-off since mode clutch 42 is no longer utilized to establish and maintain the locked condition. Locked-out clutch 250 includes a mode sleeve 252 that is moveable between three distinct positions to establish these different drive connections between interaxle differential 62' and output shafts 40 and 30. As seen, a first clutch plate 254 is fixed to third sun gear 228, a second clutch plate 256 is fixed to rear output shaft 40, and a third clutch plate 258 is fixed to a quill shaft 260 to which drive sprocket 106 is secured. First clutch plate 254 has external spline teeth 262, second clutch plate 256 has external spline teeth 264, and third clutch plate 225 has external spline teeth 258.

Mode sleeve 252 has a first segment on which internal clutch teeth 268 are formed and a second segment on which internal clutch teeth 270 are formed. Mode sleeve 252 is shown in a first or full-time four-wheel drive mode position (denoted by position line "4DIFF") whereat its first clutch teeth 268 are meshed with teeth 262 on first clutch plate 254 and its second clutch teeth 270 are meshed with teeth 266 on third clutch plate 258. In this 4DIFF mode position, quill shaft 260 is coupled to third sun gear 228 such that driven rotation of carrier 76 cause drive torque to be distributed to rear output shaft 40 via sun gear 84 and front output shaft 30 via sun gear 228 while permitting speed differentiation therebetween so as to define the full-time four-wheel drive mode. As noted previously, this mode can be established in either of a high-range or low-range drive connection between input shaft 56 and planet carrier 76. Also, mode clutch 42 is still operable in the manner previously described to provide adaptive torque biasing control across interaxle differential 62'.

Forward sliding movement of mode sleeve 252 from its 4DIFF position to its second or locked four-wheel drive mode position (denoted by position line "4LOCK") acts to maintain engagement of clutch teeth 270 with clutch teeth 266 on third clutch plate 258 while causing clutch teeth 270 to also engage clutch teeth 264 on second clutch plate 256. In addition, such movement causes clutch teeth 268 on mode sleeve 252 to disengage clutch teeth 262 on first clutch plate 254. As such, quill shaft 260 is directly coupled to rear output shaft 40 such that front output shaft 30 is coupled via transfer unit 88 for common rotation with rear output shaft 40. In contrast, movement of mode sleeve 252 from its 4DIFF position to a third or two-wheel drive mode position (denoted by position line "2WD") causes clutch teeth 270 to disengage spline teeth 266 on third clutch plate 258 while mode sleeve teeth 268 maintain engagement with teeth 262 on first clutch plate 254 and move into engagement with clutch teeth 264 on second clutch plate 256. In this mode position, quill shaft 260 is uncoupled from third sun gear 228 and relative rotation between sun gears 84 and 228 is prevented since mode sleeve 252 couples third sun gear 228 to rear output shaft 40, thereby establishing the two-wheel drive mode. Again, it is worth noting that the locked four-wheel drive mode and two-wheel drive mode can be established in either of the high and low speed ranges made available by planetary gearset 58 and synchronized range shift system 60. It is contemplated that axial movement of mode sleeve 252 can be accomplished by drive mechanism 192 via rotation of sector plate 196 to coordinate such movement with that of range sleeve 124 and actuation of mode clutch 42. Alternatively, a separate power-operated actuator could be used to control movement of mode sleeve 252.

Figure 10:
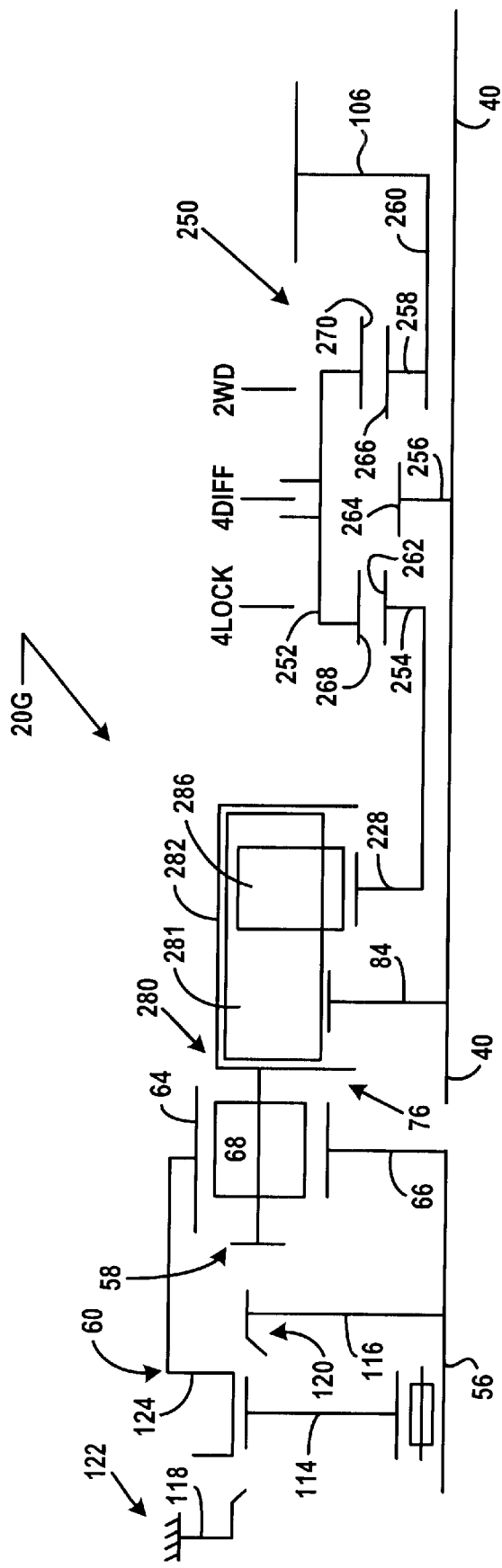
FIG. 10 is a partial schematic view of a two-speed fulltime transfer case equipped with a limited slip interaxle differential and a mode shift mechanism.

Referring now to FIG. 10, a transfer case 20G is shown equipped with planetary gearset 58 and synchronized range shift mechanism 60, a limited slip interaxle differential 280 and a mode shift mechanism 250. Limited slip differential 280 is capable of progressively biasing torque and limiting interaxle slip such that mode clutch 42 is eliminated. Limited slip differential 280 includes a drive case 282 that is fixed to carrier 76 and, in particular, to carrier ring 74. Drive case 282 has a plurality of longitudinally extending cylindrical pockets in which long pinions 284 are retained that mesh with sun gear 84. As seen, short pinions 286 are meshed with sun gear 228 and long pinions 284 and are likewise retained in cylindrical pockets formed in case 282. Torque bias is generated by friction due to both the axial and radial thrusts of pinions 284 and 286 against inner wall surfaces of case 282. One preferred type of interaxle differential 280 is a parallel-axis helical differential made by Torsen.

Figure 11:
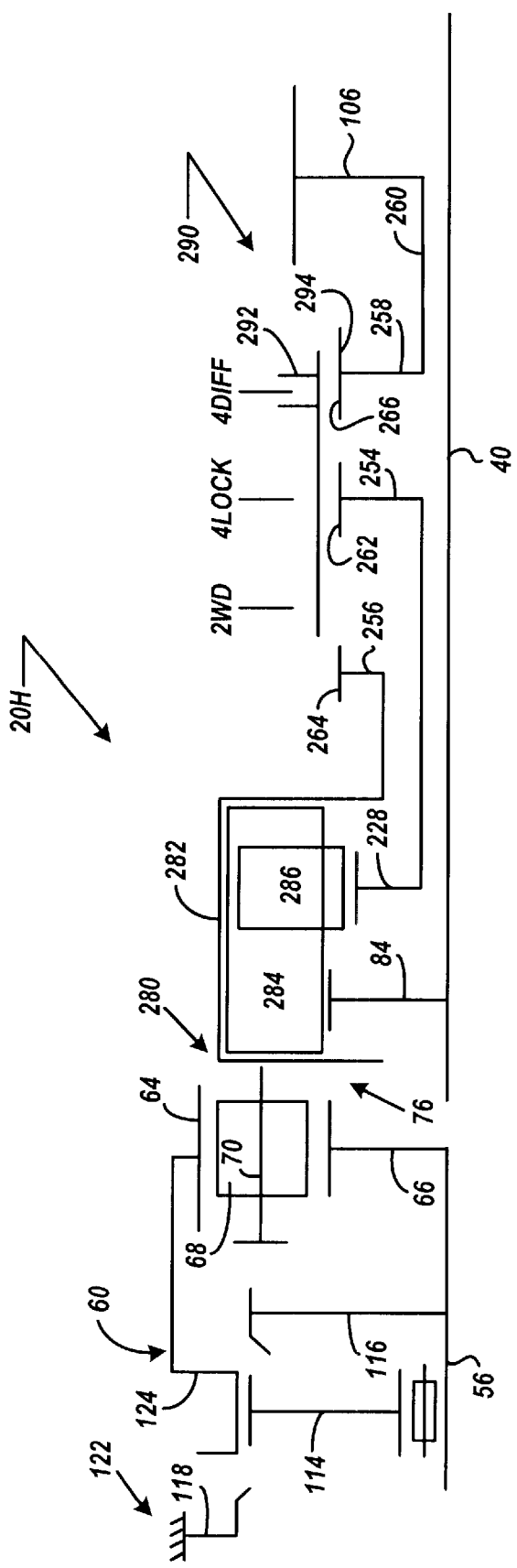
FIG. 11 is a partial schematic view of a two-speed full-time transfer case according to another preferred embodiment of the present invention.

FIG. 11 is a schematic illustration of yet another transfer case 20H which is generally similar to transfer case 20G of FIG. 10 with the exception that an alternative arrangement is shown for a mode shift mechanism 290. In this arrangement, first clutch plate 254 is still fixed to sun gear 228, third clutch plate 258 is still fixed to quill shaft 260, and second clutch plate 256 is now shown to be fixed to drive case 282. A mode sleeve 292 is adapted for sliding axial movement and has internal clutch teeth 294 in constant engagement with spline teeth 262 on first clutch plate 254. Mode sleeve 292 is shown in its full-time four-wheel drive mode position (denoted by position line "4DIFF") whereat mode sleeve 292 couples sun gear 228 to quill shaft 260 such that limited slip differential 280 is permitted to bias torque in response to interaxle slip. When mode sleeve 292 moves to its locked four-wheel drive mode position (denoted by position line "4LOCK") drive case 282 is directly coupled to sun gear 228 and quill shaft. In this position, differential 280 is locked such that speed differentiation between sun gears 84 and 228 is prevented. Finally, when mode sleeve 292 is moved to its two-wheel drive mode position (denoted by position line "2WD"), its clutch teeth 294 engage teeth 262 on first plate 254 and teeth 264 on second plate 256 while teeth 294 are released from clutch teeth 266 on third clutch plate 258. Thus, sun gear 228 is directly coupled to drive case 282 and disconnected from drive sprocket 106 such that all drive torque is transmitted through sun gear 84 to rear output shaft 40. It is contemplated that a mode fork moved under the control of a sector plate, similar to mode fork 178 of FIG. 2, can be used to control axial movement of mode sleeve 292 in coordination with range sleeve 124.

Figure 12:
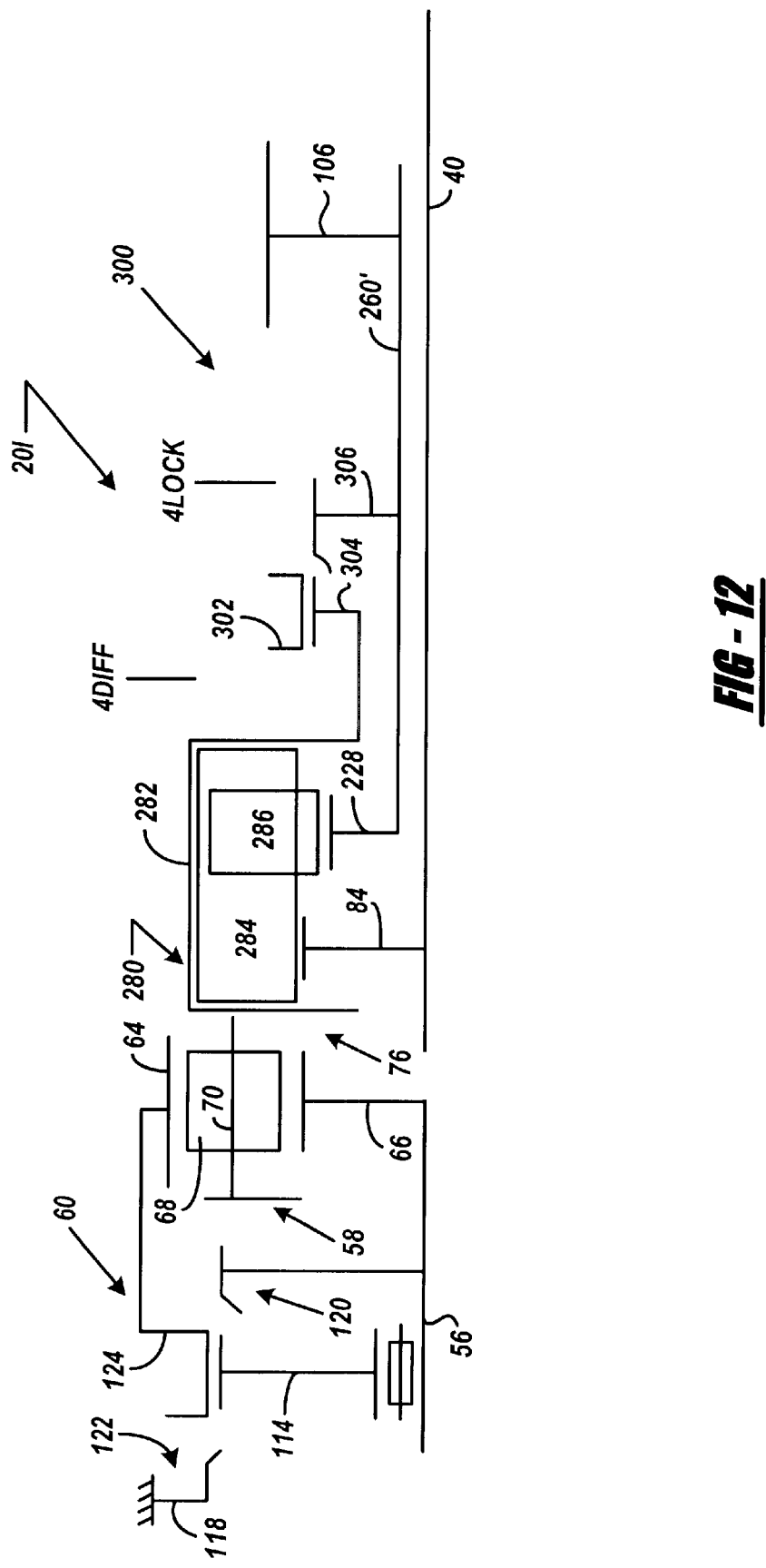
FIG. 12 is a partial schematic view of another embodiment of a two-speed full-time transfer case.

FIG. 12 illustrates a transfer case 20I which is similar to transfer cases 20G and 20H of FIGS. 10 and 11, respectively, but which has a modified lock-out clutch mechanism 300. Basically, quill shaft 260' couples sun gear 228 to drive sprocket 106 and a mode sleeve 302 is supported on a hub 304 secured to drive case 282 for axial movement between a 4DIFF position and a 4LOCK position. In the 4DIFF position, mode sleeve 302 is released from engagement with a clutch plate 306 fixed to quill shaft 260' such that limited slip differential 280 is permitted to bias torque and limit slip on-demand in response to interaxle slip. In contrast, movement of mode sleeve 302 to its 4LOCK position functions to directly couple drive case 282 to sun gear 228, thereby locking differential 280 to establish the locked four-wheel drive modes. Again, a mode fork driven by sector plate 196 is contemplated for permitting gearmotor 190 to control coordinated movement of range sleeve 124 and mode sleeve 302.

Figure 13:
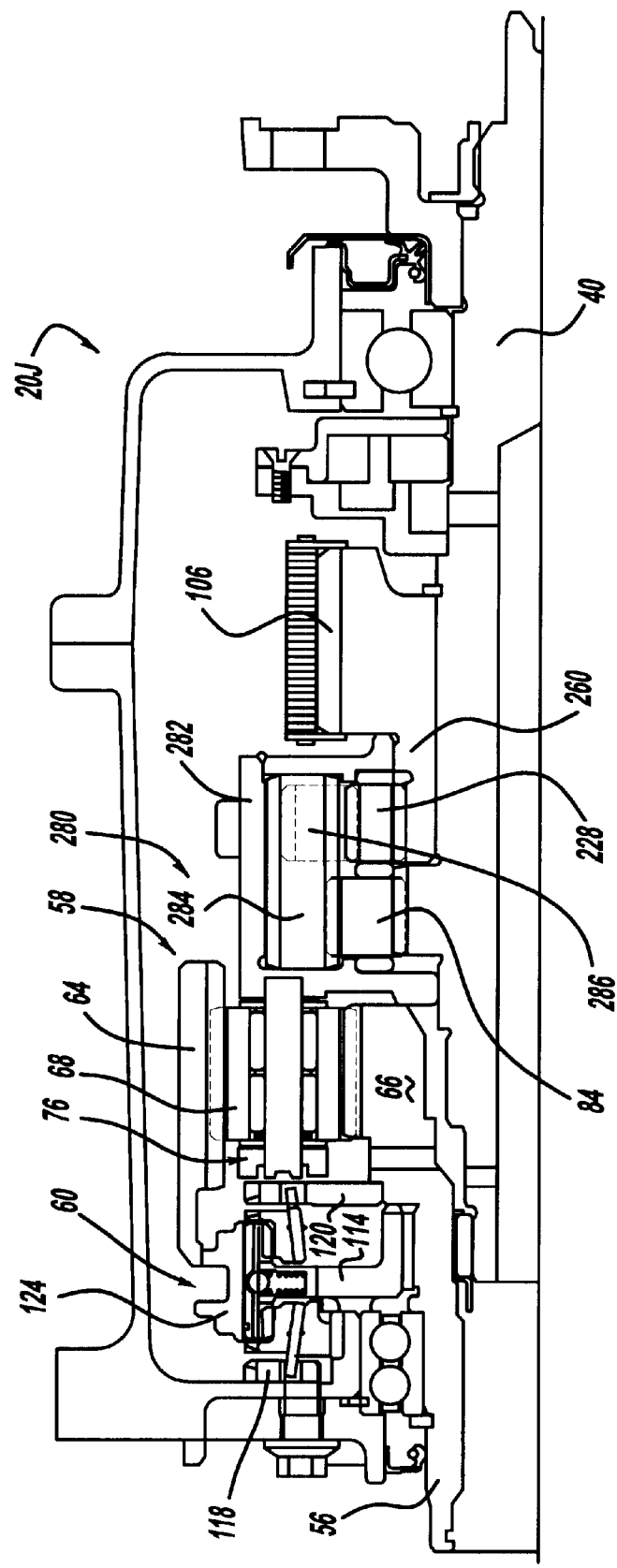
FIG. 13 is a partial sectional view of a two-speed full-time transfer case according to the present invention.

Finally, FIG. 13 shows a transfer case 20J in which limited slip differential 280 controls torque biasing and speed differentiation between the output shafts. Transfer case 20J is a two-speed synchronized range shift version having on-demand limited slip capability.

Due to the use of bi-directional synchronized range shift mechanism 60, the two-speed transfer cases can be shifted "on-the-move" into any available drive mode without the requirement that the motor vehicle be in a non-motive condition. Preferably, the synchronizing capacity of first and second synchronizer assemblies 120 and 122 are selected to prevent high-range to low-range shifts when the vehicle speed exceeds a predetermined speed, most preferably in the range of about 30 to 50 miles per hour. Alternatively, synchronized range shift mechanism 60 can be equipped with a shift inhibitor mechanism for preventing such a high to low range shift above a certain vehicle speed. Such shift prevention can likewise be controlled electronically in association with the control system of the present invention.

The foregoing discussion discloses and describes the preferred embodiments for the present invention. However, one skilled in the art will readily recognize from such discussion, and from the accompanying drawings and claims, that various changes, modifications and variations can be made therein without departing from the true spirit and fair scope of the invention as defined in the following claims.

What is claimed is:

1. A transfer case for use in a vehicle having a power source and first and second drivelines, comprising:
   an input shaft adapted to receive drive torque from the power source;
   a first output shaft adapted to transmit drive torque to the first driveline;
   a second output shaft adapted to transmit drive torque to the second driveline;
   a planetary gearset having a sun gear driven by said input shaft, a ring gear, and pinion gears rotatably supported from a carrier and which are meshed with said sun gear and said ring gear;
   a range clutch fixed to said ring gear such that said ring gear translates with said range clutch, said range clutch moveable between first second positions, said range clutch operable in its first position to couple said ring gear to said sun gear for establishing a first speed ratio drive connection between said input shaft and said carrier, and said range clutch is operable in its second position to couple said ring gear to a stationary member for establishing a second speed ratio drive connection between said input shaft and said carrier;
   an interaxle differential having an input member driven by said carrier, a first output member driving said first output shaft, and a second output member;
   a transfer assembly interconnected to said second output shaft;
   a lockout clutch moveable between first and second positions, said lockout clutch is operable in its first position to couple said second output member of said interaxle differential to said transfer assembly and said lockout clutch is operable in its second position to couple said second output member of said interaxle differential to one of said input member of said interaxle differential and said first output shaft; and
   a shift system for controlling movement of said range clutch and said lockout clutch.

2. The transfer case of claim 1 further comprising a mode clutch operably disposed between any two members of said interaxle differential.

3. The transfer case of claim 1 wherein said lockout clutch is further operable in a third position to couple said transfer assembly to said first output shaft.

4. The transfer case of claim 1 wherein said lockout clutch is further operable in a third position to couple said second output member to both said transfer assembly and said input member.

5. The transfer case of claim 1 wherein said shift system includes an electric actuator having a rotary output and a drive mechanism for converting rotary motion of said electric actuator output into translational movement of said range clutch and said lockout clutch.

6. The transfer case of claim 1 further comprising a friction clutch disposed between any two members of said interaxle differential and a clutch operator that is moveable relative to said friction clutch between a released position and a fully engaged position.

7. The transfer case of claim 6 wherein said shift systems is operable to control movement of said clutch operator between its released and fully engaged positions.

8. The power transfer system of claim 1 wherein said interaxle differential is a planetary unit having a second carrier as its input member, a second sun gear as its first output member, a third sun gear as its second output member, and a gearset rotatably supported from said second carrier which is meshed with said second and third sun gears.

9. The transfer case of claim 1 wherein said interaxle differential is a limited slip device having a drive case as its input member, a second sun gear as its first output member, and a third sun gear as its second output member, and further including second pinion gears disposed in cylindrical cavities formed in said drive case that are meshed with said second sun gear, and third pinions that are meshed with said second pinions and said third sun gear.

10. The power transfer system of claim 1 wherein said range clutch comprises:
    a first clutch plate fixed to said input shaft;
    a second clutch plate fixed to said stationary member; and
    a range sleeve fixed to said ring gear and having clutch teeth that are releasably engageable with clutch teeth on said first clutch plate when said range sleeve is in its first position, and wherein said clutch teeth on said range sleeve are releasably engageable with clutch teeth on said second clutch plate when said range sleeve is in its second position.

11. The power transfer system of claim 10 wherein said range clutch further comprises:
    a first synchronizer disposed between said range sleeve and said first clutch plate and which is operable to cause speed synchronization between said ring gear and said input shaft in response to movement of said range sleeve to its first position; and
    a second synchronizer disposed between said range sleeve and said second clutch plate and which is operable to cause speed synchronization between said ring gear and said stationary member in response to movement of said range sleeve to its second position.

12. A transfer case for use in a vehicle having a power source and first and second drivelines, comprising:

an input shaft adapted to receive drive torque from the power source;

a first output shaft adapted to transmit drive torque to the first driveline;

a second output shaft adapted to transmit drive torque to the second driveline;

a planetary gearset having a sun gear driven by said input shaft, a ring gear, and pinion gears rotatably supported from a carrier and which are meshed with said sun gear and said ring gear;

a range clutch fixed to said ring gear such that said ring gear translates with said range clutch, said range clutch moveable between first and second positions, said range clutch operable in its first position to couple said ring gear to said sun gear for establishing a first speed ratio drive connection between said input shaft and said carrier, and said range clutch is operable in its second position to couple said ring gear to a stationary member for establishing a second speed ratio drive connection between said input shaft and said carrier;

an interaxle differential having an a second sun gear fixed to said first output shaft, a third sun gear, and a gearset supported from said carrier and meshed with said second and third sun gears;

a transfer assembly interconnected to said second output shaft;

a lockout clutch moveable between first and second positions, said lockout clutch is operable in its first position to couple said third sun gear to said transfer assembly and said lockout clutch is operable in its second position to couple said third sun gear to said first output shaft; and a shift system for controlling movement of said range clutch and said lockout clutch.

13. The transfer case of claim 12 wherein said lockout clutch is further operable in a third position to couple said transfer assembly to said first output shaft.

14. The transfer case of claim 12 wherein said shift system includes an electric actuator having a rotary output and a drive mechanism for converting rotary motion of said electric actuator output into translational movement of said range clutch and said lockout clutch.

15. The transfer case of claim 12 further comprising a friction clutch disposed between any two of said carrier and said second and third sun gears, and a clutch operator that is moveable relative to said friction clutch between a released position and a fully engaged position.

16. The transfer case of claim 12 wherein said shift system is further operable to control movement of said clutch operator between its released and fully engaged positions.

17. The power transfer system of claim 12 wherein said range clutch comprises:

a first clutch plate fixed to said input shaft;

a second clutch plate fixed to said stationary member; and a range sleeve fixed to said ring gear and having clutch teeth that are releasably engageable with clutch teeth on said first clutch plate when said range sleeve is in its first position, and wherein said clutch teeth on said range sleeve are releasably engageable with clutch teeth on said second clutch plate when said range sleeve is in its second position.

18. The power transfer system of claim 17 wherein said range clutch further comprises:

a first synchronizer disposed between said range sleeve and said first clutch plate and which is operable to cause speed synchronization between said ring gear and said input shaft in response to movement of said range sleeve to its first position; and a second synchronizer disposed between said range sleeve and said second clutch plate and which is operable to cause speed synchronization between said ring gear and said stationary member in response to movement of said range sleeve to its second position.

19. A transfer case for use in a vehicle having a power source and first and second drivelines, comprising:

an input shaft adapted to receive drive torque from the power source;

a first output shaft adapted to transmit drive torque to the first driveline;

a second output shaft adapted to transmit drive torque to the second driveline;

a planetary gearset having a sun gear driven by said input shaft, a ring gear, and pinion gears rotatably supported from a carrier and which are meshed with said sun gear and said ring gear;

a range clutch fixed to said ring gear such that said ring gear translates with said range clutch, said range clutch moveable between first and second positions, said range clutch operable in its first position to couple said ring gear to said sun gear for establishing a first speed ratio drive connection between said input shaft and said carrier, and said range clutch is operable in its second position to couple said ring gear to a stationary member for establishing a second speed ratio drive connection between said input shaft and said carrier;

an interaxle differential having an a second sun gear fixed to said first output shaft, a third sun gear, and a gearset supported from said carrier and meshed with said second and third sun gears;

a transfer assembly interconnected to said second output shaft;

a lockout clutch moveable between first, second and third positions, said lockout clutch is operable in its first position to couple said third sun gear to said transfer assembly, said lockout clutch is operable in its second position to couple said third sun gear to said first output shaft, and said lockout clutch is operable in its third position to couple said transfer assembly to said first output shaft;

a clutch pack operably disposed between any two of said carrier and said second and third sun gears;

a clutch operator moveable relative to said clutch pack between released and engaged positions; and a shift system for controlling movement of said range clutch, said lockout clutch, and said clutch operator.

20. The transfer case of claim 19 wherein said shift system includes an electric actuator and a drive mechanism driven by said electric actuator for controlling movement of said range clutch and said lockout clutch.

21. The transfer case of claim 20 wherein said drive mechanism further controls movement of said clutch operator.

22. The power transfer system of claim 19 wherein said range clutch comprises:

a first clutch plate fixed to said input shaft;

a second clutch plate fixed to said stationary member; and a range sleeve fixed to said ring gear and having clutch teeth that are releasably engageable with clutch teeth on said first clutch plate when said range sleeve is in its first position, and wherein said clutch teeth on said range sleeve are releasably engageable with clutch teeth on said second clutch plate when said range sleeve is in its second position.

23. The power transfer system of claim 22 wherein said range clutch further comprises:

a first synchronizer disposed between said range sleeve and said first clutch plate and which is operable to cause speed synchronization between said ring gear and said input shaft in response to movement of said range sleeve to its first position; and a second synchronizer disposed between said range sleeve and said second clutch plate and which is operable to cause speed synchronization between said ring gear and said stationary member in response to movement of said range sleeve to its second position.

24. A transfer case for use in a vehicle having a power source and first and second drivelines, comprising:

an input shaft adapted to receive drive torque from the power source;

a first output shaft adapted to transmit drive torque to the first driveline;

a second output shaft adapted to transmit drive torque to the second driveline;

a planetary gearset having a sun gear driven by said input shaft, a ring gear, and pinion gears rotatably supported from a carrier and which are meshed with said sun gear and said ring gear;

a range clutch fixed to said ring gear such that said ring gear translates with said range clutch, said range clutch moveable between first and second positions, said range clutch operable in its first position to couple said ring gear to said sun gear for establishing a first speed ratio drive connection between said input shaft and said carrier, and said range clutch is operable in its second position to couple said ring gear to a stationary member for establishing a second speed ratio drive connection between said input shaft and said carrier;

an interaxle differential having a drive case driven by said carrier, a second sun gear driving said first output shaft, a third sun gear, and a slip limiting gearset mounted in said drive case and meshed with said second and third sun gears;

a transfer assembly interconnected to said second output shaft;

a lockout clutch moveable between first, second and third positions, said lockout clutch is operable in its first position to couple said third sun gear to said transfer assembly, said lockout clutch is operable in its second position to couple third sun gear to said drive case, and said lockout clutch is operable in its third position to couple said third sun gear to both said drive case and said transfer assembly; and a shift system for controlling movement of said range clutch and said lockout clutch.

25. The power transfer system of claim 24 wherein said range clutch comprises:

a first clutch plate fixed to said input shaft;

a second clutch plate fixed to said stationary member; and a range sleeve fixed to said ring gear and having clutch teeth that are releasably engageable with clutch teeth on said first clutch plate when s aid range sleeve is in its first position, and wherein said clutch teeth on said range sleeve are releasably engageable with clutch teeth on said second clutch plate when said range sleeve is in its second position.

26. The power transfer system of claim 25 wherein said range clutch further comprises:

a first synchronizer disposed between said range sleeve and said first clutch plate and which is operable to cause speed synchronization between said ring gear and said input shaft in response to movement of said range sleeve to its first position; and a second synchronizer disposed between said range sleeve and said second clutch plate and which is operable to cause speed synchronization between said ring gear and said stationary member in response to movement of said range sleeve to its second position.

27. The transfer case of claim 24 wherein said shift system includes an electric actuator having a rotary output and a drive mechanism for converting rotary motion of said electric actuator output into translational movement of said range clutch and said lockout clutch.

28. A transfer case for use in a vehicle having a power source and first and second drivelines, comprising:

an input shaft adapted to receive drive torque from the power source;

a first output shaft adapted to transmit drive torque to the first driveline;

second output shaft adapted to transmit drive torque to the second driveline;

a planetary gearset having a sun gear driven by said input shaft, a ring gear, and pinion gears rotatably supported from a carrier and which are meshed with said sun gear and said ring gear;

a range clutch fixed to said ring gear such that said range translates with said range clutch, said range clutch moveable between first and second positions, said range clutch operable in its first position to couple said ring gear to said sun gear for establishing a first speed ratio drive connection between said input shaft and said carrier, and said range clutch is operable in its second position to couple said ring gear to a stationary member for establishing a second speed ratio drive connection between said input shaft and said carrier;

an interaxle differential having an input member driven by said carrier, a first output member driving said first output shaft, and a second output member driving said second output shaft;

a lockout clutch moveable between first and second positions, said lockout clutch is operable in its first position to permit relative rotation between said input member and said second output member and said lockout clutch is operable in its second position to couple said second output member to said input member; and a shift system for controlling movement of said range clutch and said lockout clutch.

29. The transfer case of claim 28 wherein said shift system includes an electric actuator having a rotary output and a drive mechanism for converting rotary motion of said electric actuator output into translational movement of said range clutch and said lockout clutch.

30. The transfer case of claim 28 wherein said interaxle differential is a limited slip device having a drive case as its input member, a second sun gear as its first output member, and a third sun gear as its second output member, and further including second pinion gears disposed in said drive case which are meshed with said second sun gear, and third pinions disposed in said drive case which are meshed with said second pinions and said third sun gear.

31. The power transfer system of claim 28 wherein said range clutch comprises:

a first clutch plate fixed to said input shaft;

a second clutch plate fixed to said stationary member;

a range sleeve fixed to said ring gear and having clutch teeth that are releasably engageable with clutch teeth on said first clutch plate when said range sleeve is in its first position, and wherein said clutch teeth on said range sleeve are releasably engageable with clutch teeth on said second clutch plate when said range sleeve is in its second position;

a first synchronizer disposed between said range sleeve and said first clutch plate and which is operable to cause speed synchronization between said ring gear and said input shaft in response to movement of said range sleeve to its first position; and a second synchronizer disposed between said range sleeve and said second clutch plate and which is operable to cause speed synchronization between said ring gear and said stationary member in response to movement of said range sleeve to its second position.

32. A transfer case for use in a vehicle having a power source and first and second drivelines, comprising:

an input shaft adapted to receive drive torque from the power source;

a first output shaft adapted to transmit drive torque to the first driveline;

a second output shaft adapted to transmit drive torque to the second driveline;

a planetary gearset having a sun gear driven by said input shaft, a ring gear, and pinion gears rotatably supported from a carrier and which are meshed with said sun gear and said ring gear;

a range clutch fixed to said ring gear such that said range gear translates with said range clutch, said range clutch moveable between first and second positions, said range clutch operable in its first position to couple said ring gear to said sun gear for establishing a first speed ratio drive connection between said input shaft and said carrier, and said range clutch is operable in its second position to couple said ring gear to a stationary member for establishing a second speed ratio drive connection between said input shaft and said carrier;

an interaxle differential having a drive case driven by said carrier, a second sun gear driving said first output shaft, a third sun gear driving said second output shaft, and a slip limiting gearset mounted in said drive case and meshed with said second and third sun gears;

a transfer assembly interconnected to said second output shaft;

a lockout clutch moveable between first and second positions, said lockout clutch is operable in its first position to permit relative rotation between said drive case and said third sun gear, and said lockout clutch is operable in its second position to couple said third sun gear to said drive case; and a shift system for controlling movement of said range clutch and said lockout clutch.

33. The power transfer system of claim 32 wherein said range clutch comprises:

a first clutch plate fixed to said input shaft;

a second clutch plate fixed to said stationary member;

a range sleeve fixed to said ring gear and having clutch teeth that are releasably engageable with clutch teeth on said first clutch plate when said range sleeve is in its first position, and wherein said clutch teeth on said range sleeve are releasably engageable with clutch teeth on said second clutch plate when said range sleeve is in its second position;

a first synchronizer disposed between said range sleeve and said first clutch plate and which is operable to cause speed synchronization between said ring gear and said input shaft in response to movement of said range sleeve to its first position; and a second synchronizer disposed between said range sleeve and said second clutch plate and which is operable to cause speed synchronization between said ring gear and said stationary member in response to movement of said range sleeve to its second position.

34. The transfer case of claim 32 wherein said shift system includes an electric actuator having a rotary output and a drive mechanism for converting rotary motion of said electric actuator output into translational movement of said range clutch and said lockout clutch.

* * * * *